United States Patent
Chen et al.

(10) Patent No.: US 10,728,861 B2
(45) Date of Patent: Jul. 28, 2020

(54) SPECTRAL MASK AND FLATNESS FOR WIRELESS LOCAL AREA NETWORKS

(71) Applicant: QUALCOMM Incorporated, San Diego, CA (US)

(72) Inventors: Jialing Li Chen, San Diego, CA (US); Lin Yang, San Diego, CA (US); Bin Tian, San Diego, CA (US); Sameer Vermani, San Diego, CA (US); Lochan Verma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/154,530

(22) Filed: Oct. 8, 2018

(65) Prior Publication Data
US 2019/0110261 A1 Apr. 11, 2019

Related U.S. Application Data

(60) Provisional application No. 62/582,260, filed on Nov. 6, 2017, provisional application No. 62/571,207, filed
(Continued)

(51) Int. Cl.
*H04W 52/36* (2009.01)
*H04B 1/7156* (2011.01)
(Continued)

(52) U.S. Cl.
CPC ........ *H04W 52/367* (2013.01); *H04B 1/7156* (2013.01); *H04L 5/001* (2013.01);
(Continued)

(58) Field of Classification Search
CPC . H04L 5/00; H04L 5/001; H04L 5/003; H04L 5/0007; H04L 5/0037;
(Continued)

(56) References Cited

U.S. PATENT DOCUMENTS 8,150,478 B2 * 4/2012 Perets ................... H04W 52/10
455/574
8,855,131 B2 * 10/2014 Imamura ................ H04L 5/001
370/329
(Continued)

FOREIGN PATENT DOCUMENTS

EP           2557708 A1     2/2013
WO     WO-2013188030 A2   12/2013
(Continued)

OTHER PUBLICATIONS

International Search Report and Written Opinion—PCT/US2018/055079—ISA/EPO—dated Jan. 21, 2019.

*Primary Examiner* — Tri H Phan
(74) *Attorney, Agent, or Firm* — Holland & Hart LLP/Qualcomm

(57) ABSTRACT

Methods, systems, and devices for wireless communication are described. A wireless device may identify a transmission mode for transmission of an input signal to be transmitted. The input signal may thus be modulated according to the identified transmission mode, and the modulated signal may then be transmitted at some power level to produce a transmitted signal having a spectral envelope. In some cases, the spectral envelope may be defined in terms of a power spectral density (PSD) of the transmitted waveform. The PSD may generally define the power of the waveform signal distributed over frequencies of the waveform. Further, the wireless device may control the modulation of the input signal, in addition to the power level of the input signal, to maintain the spectral envelope to be within a spectral mask defined for the implemented transmission mode as well as to conform to spectral flatness parameters.

30 Claims, 16 Drawing Sheets

Related U.S. Application Data on Oct. 11, 2017, provisional application No. 62/586,081, filed on Nov. 14, 2017, provisional application No. 62/625,293, filed on Feb. 1, 2018.

(51) Int. Cl.
| | |
|---|---|
| *H04W 52/16* | (2009.01) |
| *H04W 72/04* | (2009.01) |
| *H04L 5/00* | (2006.01) |
| *H04L 25/03* | (2006.01) |
| *H04W 52/26* | (2009.01) |
| *H04W 52/22* | (2009.01) |
| *H04L 27/26* | (2006.01) |
| *H04W 52/28* | (2009.01) |

(52) U.S. Cl.
CPC ............ *H04L 5/003* (2013.01); *H04L 5/0007* (2013.01); *H04L 5/0037* (2013.01); *H04L 5/0048* (2013.01); *H04L 25/03834* (2013.01); *H04L 27/2602* (2013.01); *H04L 27/2605* (2013.01); *H04W 52/16* (2013.01); *H04W 52/225* (2013.01); *H04W 52/262* (2013.01); *H04W 52/281* (2013.01); *H04W 72/0453* (2013.01); *H04B 2001/71563* (2013.01); *H04L 27/26* (2013.01)

(58) Field of Classification Search
CPC . H04L 5/0048; H04L 25/03; H04L 25/03834; H04L 27/26; H04L 27/2602; H04L 27/2605; H04W 52/16; H04W 52/36; H04W 52/225; H04W 52/262; H04W 52/281; H04W 52/367; H04W 72/04; H04W 72/0453; H04B 1/7156; H04B 2001/71563

See application file for complete search history.

(56) References Cited

U.S. PATENT DOCUMENTS

| | | | |
|---|---|---|---|
| 8,923,437 B2* | 12/2014 | Geile | H04L 5/0041 375/295 |
| 9,160,503 B2* | 10/2015 | Kim | H04L 1/0003 |
| 9,281,924 B2* | 3/2016 | Abraham | H04L 5/0023 |
| 9,350,477 B1* | 5/2016 | Jung | H04W 72/082 |
| 9,525,522 B2 | 12/2016 | Yang et al. | |
| 9,560,606 B2* | 1/2017 | Seyama | H04W 52/243 |
| 9,571,256 B2 | 2/2017 | Azizi et al. | |
| 9,813,206 B2* | 11/2017 | Kim | H04L 1/0003 |
| 9,832,059 B2* | 11/2017 | Zhang | H04L 5/0048 |
| 9,860,048 B2* | 1/2018 | Lim | H04L 5/001 |
| 10,355,956 B2* | 7/2019 | Yang | H04L 43/0876 |
| 10,362,574 B2* | 7/2019 | Chendamarai Kannan | H04W 72/0453 |
| 10,506,596 B2* | 12/2019 | Yerramalli | H04W 16/14 |
| 2015/0223246 A1 | 8/2015 | Yang et al. | |
| 2016/0218844 A1 | 7/2016 | Suh et al. | |
| 2016/0353435 A1 | 12/2016 | Ghosh | |
| 2017/0273083 A1* | 9/2017 | Chen | H04L 1/0041 |
| 2019/0109684 A1 | 4/2019 | Chen et al. | |
| 2019/0253296 A1 | 8/2019 | Chen et al. | |
| 2020/0100251 A1* | 3/2020 | Yerramalli | H04W 16/14 |

FOREIGN PATENT DOCUMENTS

| | | |
|---|---|---|
| WO | WO-2015099803 A1 | 7/2015 |
| WO | WO-2015187720 A2 | 12/2015 |

* cited by examiner

SPECTRAL MASK AND FLATNESS FOR WIRELESS LOCAL AREA NETWORKS

CROSS REFERENCES

The present Application for patent claims the benefit of U.S. Provisional Patent Application No. 62/582,260 by CHEN, et al., entitled "SPECTRAL MASK AND FLATNESS FOR WIRELESS LOCAL AREA NETWORKS," filed Nov. 6, 2017, and to U.S. Provisional Patent Application No. 62/571,207 by CHEN, et al., entitled "SYSTEMS AND METHODS OF COMMUNICATING VIA SUB-BANDS IN WIRELESS COMMUNICATION NETWORKS", filed Oct. 11, 2017, and to U.S. Provisional Patent Application No. 62/586,081 by CHEN, et al., entitled, "SYSTEMS AND METHODS OF COMMUNICATING VIA SUB-BANDS IN WIRELESS COMMUNICATION NETWORKS" filed Nov. 14, 2017, and to U.S. Provisional Patent Application No. 62/625,293 by CHEN, et al, entitled "SYSTEMS AND METHODS OF COMMUNICATING VIA SUB-BANDS IN WIRELESS COMMUNICATION NETWORKS" filed Feb. 1, 2018, assigned to the assignee hereof, and expressly incorporated herein.

BACKGROUND

The following relates generally to wireless communication, and more specifically to spectral mask and flatness for WLAN.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink and uplink. The downlink (or forward link) may refer to the communication link from the AP to the station, and the uplink (or reverse link) may refer to the communication link from the station to the AP.

Wireless devices (e.g., APs and STAs) may communicate by transmitting and receiving wireless waveforms (e.g., encoded with information) over-the-air in an available radio frequency spectrum band. A wireless device may thus include a transmitter to configure and transmit waveforms, as well as a receiver to receive waveforms (e.g., to decode the encoded information in the waveform). Transmitted waveforms may include signals that occupy a medium (e.g., transmitted signals may introduce energy onto the over-the-air medium or radio frequency spectrum band). These signals may result in interference in adjacent and/or alternate radio spectrum bands. For example, in wideband transmissions that occupy more than one band (or channel), characteristics or parameters of the waveform may impact the amount of interference in neighboring bands. Increased interference may reduce system performance (e.g., lower physical layer transfer rates, reduce medium reuse for other devices, etc.).

SUMMARY

The described techniques relate to improved methods, systems, devices, or apparatuses that support spectral mask and flatness for wireless communications (e.g., wireless local area network (WLAN) communications). For example, a WLAN radio of a station (STA) and/or access point (AP) may include a transmitter that transmits waveforms conforming to waveform parameters described herein. That is, a WLAN radio, or a transmitter of the radio, may generate a wideband waveform according to waveform parameters such as a bandwidth and a center frequency. The waveform may be transmitted according to a transmission mode selected or identified based on channel availability. Example 320 MHz total bandwidth transmission modes may include a contiguous 320 MHz frequency band, two non-contiguous 160 MHz frequency bands (e.g., two 160 MHz frequency bands separated by an unused subband, the total bandwidth for transmission being 320 MHz), three disjoint frequency bands (e.g., one 160 MHz band and two other 80 MHz bands, each separated by an unused subband), four non-contiguous 80 MHz frequency bands (e.g., four 80 MHz bands, each separated by unused subbands), etc. Further, example 240 MHz total bandwidth transmission modes may include a non-contiguous 160 MHz and a 80 MHz frequency band, three non-contiguous 80 MHz frequency bands, etc.

A wireless device may identify a transmission mode for an input signal to be transmitted (e.g., input to a physical (PHY) layer of the wireless device from an upper layer). The input signal may thus be modulated according to the identified transmission mode, and the modulated signal may then be transmitted at some power level to produce a transmitted signal that has a spectral envelope. In some cases, the spectral envelope may be defined in terms of a power spectral density (PSD) of the transmitted waveform. The PSD may generally define the power of the waveform signal distributed over frequencies of the waveform. Further, the wireless device may control the modulation of the input signal, in addition to the power level of the input signal, to maintain the spectral envelope to be within a spectral mask defined for the identified transmission mode.

The wireless device may transmit the waveform in compliance with a spectral mask that is associated with certain spectral mask parameters (e.g., which may be defined based on a transmission mode, symbol duration, etc.). The spectral mask includes frequency offset rolloff portions, each rolloff portion having an associated slope. For example, the spectral mask may include three rolloff portions for each side of the waveform (e.g., for each of the leading and trailing edges of the waveform). The rolloff portions may begin at a certain frequency and end at a certain frequency offset from the center frequency of each radio frequency (RF) spectrum band defined by the transmission mode. For transmission modes with three or more non-contiguous RF spectrum bands, each RF spectrum band may be associated with an interim spectral mask, and the interim spectral masks may be superimposed, according to certain rules and spectral mask parameters as discussed in more detail below, resulting in a spectral mask for the transmission mode (e.g., a composite spectral mask).

Other aspects of the present description disclose techniques for spectral flatness attributes of the waveform for a transmission mode. The transmitter may generate and transmit a waveform that conforms to spectral flatness parameters (e.g., requirements). The spectral flatness requirements may be applied to some or all of the subcarriers used in the transmission mode, and may be different for different subcarriers, or sets of subcarriers, used in the transmission mode. Example spectral flatness attributes include, but are not limited to, maximum deviation parameters for sets of subcarriers within regions of the bandwidth. The maximum deviation parameters may be different for different sets of subcarriers in different regions of the bandwidth. The deviation parameters may be based on a carrier index for the bandwidth, and the deviation parameters may be different for spectral masks for different transmission modes.

A method of wireless communication is described. The method may include identifying a transmission mode for the transmission of an input signal, the transmission mode having at least three non-contiguous RF spectrum bands. The method may further include modulating the input signal to generate a modulated signal according to the identified transmission mode, and transmitting the modulated signal at a power level to produce a transmitted signal having a spectral envelope. The method may further include controlling the modulation of the input signal to be transmitted to maintain the spectral envelope to be within a spectral mask that is defined for the transmission mode having at least three non-contiguous RF spectrum bands.

An apparatus for wireless communication is described. The apparatus may include means for identifying a transmission mode for the transmission of an input signal, the transmission mode having at least three non-contiguous RF spectrum bands. The apparatus may further include means for modulating the input signal to generate a modulated signal according to the identified transmission mode, and means for transmitting the modulated signal at a power level to produce a transmitted signal having a spectral envelope. The apparatus may further include means for controlling the modulation of the input signal to be transmitted to maintain the spectral envelope to be within a spectral mask that is defined for the transmission mode having at least three non-contiguous RF spectrum bands.

Another apparatus for wireless communication is described. The apparatus may include a processor, memory in electronic communication with the processor, and instructions stored in the memory. The instructions may be operable to cause the processor to identify a transmission mode for the transmission of an input signal, the transmission mode having at least three non-contiguous RF spectrum bands. The instructions may be operable to further cause the processor to modulate the input signal to generate a modulated signal according to the identified transmission mode, and transmit the modulated signal at a power level to produce a transmitted signal having a spectral envelope. The instructions may be operable to further cause the processor to control the modulation of the input signal to be transmitted to maintain the spectral envelope to be within a spectral mask that is defined for the transmission mode having at least three non-contiguous RF spectrum bands.

A non-transitory computer-readable medium for wireless communication is described. The non-transitory computer-readable medium may include instructions operable to cause a processor to identify a transmission mode for the transmission of an input signal, the transmission mode having at least three non-contiguous RF spectrum bands, modulate the input signal to generate a modulated signal according to the identified transmission mode, transmit the modulated signal at a power level to produce a transmitted signal having a spectral envelope, and control the modulation of the input signal to be transmitted to maintain the spectral envelope to be within a spectral mask that is defined for the transmission mode having at least three non-contiguous RF spectrum bands.

In some examples of the method, apparatus, and non-transitory computer-readable medium described above, the at least three non-contiguous RF spectrum bands comprise: a first RF spectrum band of 160 MHz, a second RF spectrum band of 80 MHz, and a third RF spectrum band of 80 MHz; or the first RF spectrum band of 80 MHz, the second RF spectrum band of 80 MHz, and the third RF spectrum band of 80 MHz; or the first RF spectrum band of 80 MHz, the second RF spectrum band of 80 MHz, the third RF spectrum band of 80 MHz, and a fourth RF spectrum band of 80 MHz.

In some examples of the method, apparatus, and non-transitory computer-readable medium described above, a total bandwidth of the at least three non-contiguous RF spectrum bands for the transmission mode may be greater than 160 MHz. In some examples of the method, apparatus, and non-transitory computer-readable medium described above, a total bandwidth of the at least three non-contiguous RF spectrum bands for the transmission mode may be greater than or equal to 240 MHz.

In some examples of the method, apparatus, and non-transitory computer-readable medium described above, the total bandwidth of the at least three non-contiguous RF spectrum bands for the transmission mode may be greater than or equal to 320 MHz.

In some examples of the method, apparatus, and non-transitory computer-readable medium described above, the spectral mask comprises a first 0 dBr bandwidth corresponding to a first of the at least three non-contiguous RF spectrum bands. In some examples of the method, apparatus, and non-transitory computer-readable medium described above, the spectral mask comprises a second 0 dBr bandwidth corresponding to a second of the at least three non-contiguous RF spectrum bands, the second 0 dBr bandwidth non-contiguous with the first 0 dBr bandwidth. In some examples of the method, apparatus, and non-transitory computer-readable medium described above, the spectral mask comprises a first unused subband region between the first 0 dBr bandwidth and the second 0 dBr bandwidth, at least a portion of the first unused subband region representing a linear sum of a first interim spectral mask for the first of the at least three non-contiguous RF spectrum bands and a second interim spectral mask for the second of the at least three non-contiguous RF spectrum bands.

In some examples of the method, apparatus, and non-transitory computer-readable medium described above, the first unused subband region comprises a frequency range wherein both the first interim spectral mask and the second interim spectral mask each may have values for the frequency range greater than −40 dBr and less than −20 dBr.

In some examples of the method, apparatus, and non-transitory computer-readable medium described above, the spectral mask comprises: a first 0 dBr bandwidth corresponding to a first of the at least three non-contiguous RF spectrum bands. In some examples of the method, apparatus, and non-transitory computer-readable medium described above, the spectral mask includes a first transition bandwidth between the first 0 dBr bandwidth and −20 dBr, the first transition bandwidth less than or equal to 2 MHz.

In some examples of the method, apparatus, and non-transitory computer-readable medium described above, the first transition bandwidth may be 1 MHz or 2 MHz.

In some examples of the method, apparatus, and non-transitory computer-readable medium described above, a first bandwidth (β) may be associated with one of the at least three non-contiguous RF spectrum bands, wherein the first 0 dBr bandwidth may be β−1 MHz or β−2 MHz. In some examples of the method, apparatus, and non-transitory computer-readable medium described above, a first end of the first transition bandwidth may be offset from a center frequency of the at least three non-contiguous RF spectrum bands by β/2+0.5 MHz or β/2+1 MHz. In some examples of the method, apparatus, and non-transitory computer-readable medium described above, a second end of the first transition bandwidth may be offset from the center frequency of the at least three non-contiguous RF spectrum bands by β/2−0.5 MHz or β/2−1 MHz.

In some examples of the method, apparatus, and non-transitory computer-readable medium described above, the spectral mask further comprises: a second transition bandwidth between −20 dBr and −28 dBr, wherein a first end of the second transition bandwidth may be the first end of the first transition bandwidth, and a second end of the second transition bandwidth may be offset from the center frequency of the at least three non-contiguous RF spectrum bands by β. In some examples of the method, apparatus, and non-transitory computer-readable medium described above, a third transition bandwidth between −28 dBr and −40 dBr, wherein a first end of the third transition bandwidth may be the second end of the second transition bandwidth, and a second end of the third transition bandwidth may be offset from the center frequency of the at least three non-contiguous RF spectrum bands by 3β/2.

Some examples of the method, apparatus, and non-transitory computer-readable medium described above may further include processes, features, means, or instructions for controlling the modulation of the input signal to be transmitted to maintain the spectral envelope for a plurality of subcarriers of the at least three non-contiguous RF spectrum bands to be within a spectral flatness deviation range.

In some examples of the method, apparatus, and non-transitory computer-readable medium described above, the spectral flatness deviation range may be +4 dB/−4 dB, or +4 dB/−6 dB, or a combination thereof, for the plurality of subcarriers.

In some examples of the method, apparatus, and non-transitory computer-readable medium described above, the spectral flatness deviation range may be +4 dB/−4 dB for five or more sets of adjacent subcarriers of the plurality of subcarriers and +4 dB/−6 dB for five or more other sets of adjacent subcarriers of the plurality of subcarriers.

In some examples of the method, apparatus, and non-transitory computer-readable medium described above, each of the at least three non-contiguous RF spectrum bands comprise an RF spectrum band greater than 40 MHz.

In some examples of the method, apparatus, and non-transitory computer-readable medium described above, the transmission mode uses a tone spacing of 78.125 kHz, or 156.25 kHz, or 312.5 kHz, or a combination thereof.

In some examples of the method, apparatus, and non-transitory computer-readable medium described above, modulating the input signal comprises: filtering the input signal using a filter to generate a filtered input signal, and modulating the filtered input signal to generate the modulated signal. In some examples of the method, apparatus, and non-transitory computer-readable medium described above, controlling the modulation of the input signal comprises: controlling the filter to maintain the spectral envelope to be within the spectral mask that may be defined for the transmission mode.

DETAILED DESCRIPTION

Figure 1:
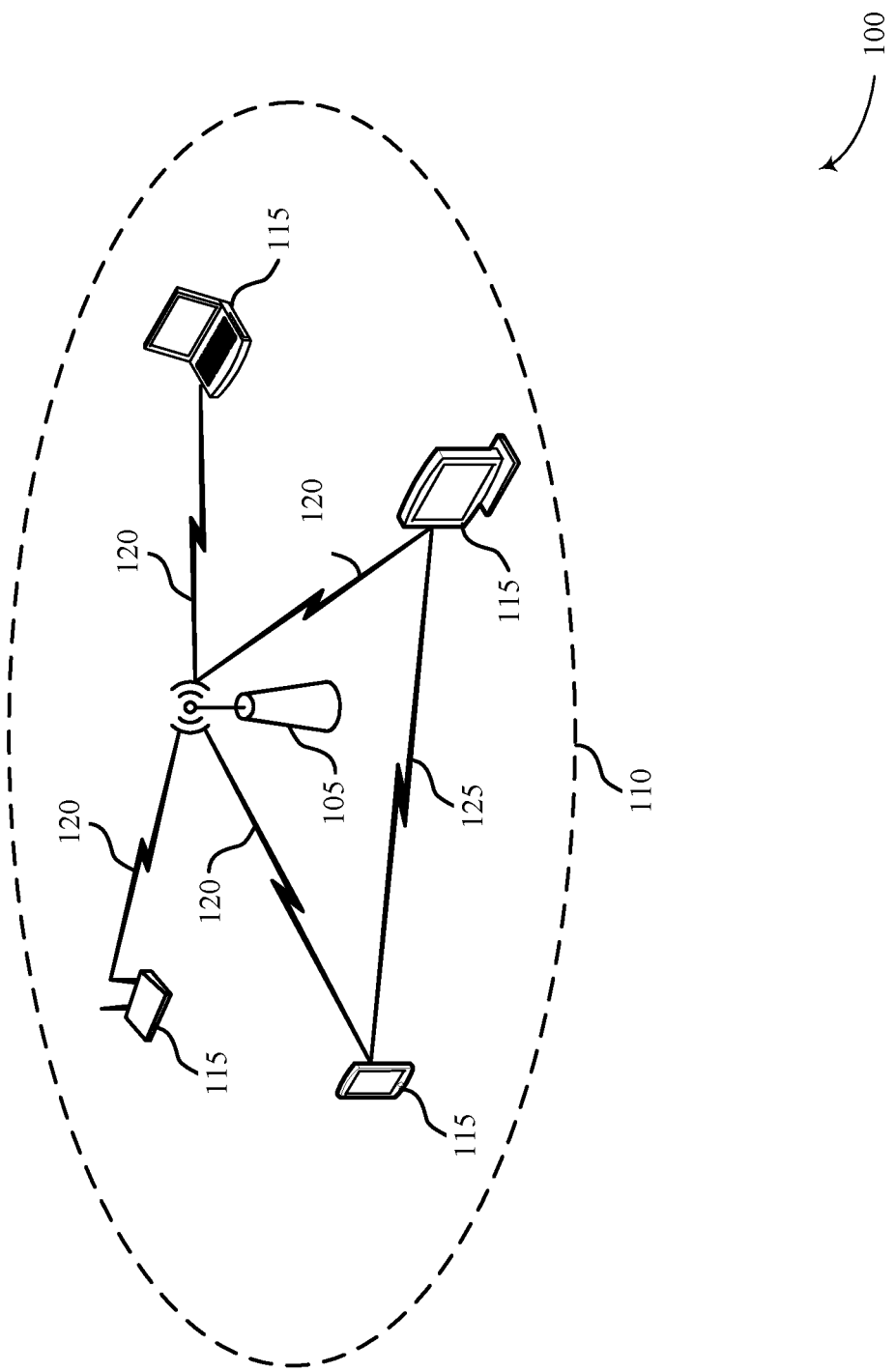
FIG. 1 illustrates an example of a system for wireless communication that supports spectral mask and flatness for wireless local area network (WLAN) in accordance with aspects of the present disclosure.

Wireless Local Area Network (WLAN) transmissions (also referred to as Wi-Fi transmissions) may result in undesirable interference on neighboring channels. Various attributes of the WLAN waveform may impact the amount and type of interference the waveform causes. The power spectral density (PSD) of the waveform may generally define the power of the waveform signal distributed over frequencies of the waveform. The characteristics of the rolloff portions of the waveform may determine the extent of interference caused on adjacent and/or alternate channels (e.g., such waveform attributes may contribute to the amount of out-of-band interference).

The present description discloses techniques for spectral masking, flatness, and analysis of waveforms used for wireless communications (e.g., WLAN communications). For example, a WLAN radio of a station (STA) and/or access point (AP) may include a transmitter that transmits waveforms conforming to waveform parameters described herein. That is, a WLAN radio, or a transmitter of the radio, may generate a wideband waveform according to waveform parameters such as a bandwidth and a center frequency. The waveform may be transmitted according to a transmission mode (e.g., a waveform mode), depending on channel availability. Example transmission modes may include a 20, 40, 80, or 160 MHz frequency band, two non-contiguous 80 MHz frequency bands (e.g., two 80 MHz frequency bands separated by an unused subband), a 240 MHz frequency band, two disjoint or non-contiguous frequency bands (e.g., one 160 MHz band and one 80 MHz band separated by an unused subband), three non-contiguous 80 MHz frequency bands (e.g., four 80 MHz bands, each separated by unused subbands), a 320 MHz frequency band, two non-contiguous 160 MHz frequency bands (e.g., two 160 MHz frequency bands separated by an unused subband), three disjoint or non-contiguous frequency bands (e.g., one 160 MHz band and two other 80 MHz bands, each separated by an unused subband), four non-contiguous 80 MHz frequency bands (e.g., four 80 MHz bands, each separated by unused subbands), etc. Unused subbands may be of the same or different bandwidth as other frequency bands of the transmission mode.

The wireless device may transmit waveforms according to (e.g., in compliance with) a spectral mask that is associated with certain spectral mask parameters. That is, the spectral mask includes a 0 dBr portion of the frequency band and rolloff portions, each rolloff portion having an associated slope. A spectral mask of a waveform may include three slopes. The three slopes generally define the profile or "skirt" of the waveform. Broadly, the slope(s) of the leading and trailing edges of the waveform determine the acceptable power levels being transmitted in the adjacent bands, with reference to the transmitted power across the waveform bandwidth. Such attributes or characteristics may be defined in terms of spectral mask parameters.

According to other aspects, the transmitter is also configured to transmit the waveform conforming to waveform attributes associated with spectral flatness parameters (e.g., spectral flatness requirements). The spectral flatness attributes include maximum deviation parameters for a region of the bandwidth of the waveform. The region of the bandwidth is defined with respect to the number of sub-carriers or tones from the center frequency of the waveform.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Aspects of the disclosure are initially described in the context of a wireless communications system. Example transmission modes, spectral masks, and process flows implementing such are then discussed. Aspects of the disclosure are further illustrated by and described with reference to apparatus diagrams, system diagrams, and flowcharts that relate to spectral mask and flatness for WLAN FIG. 1 illustrates a WLAN 100 (also known as a Wi-Fi network) configured in accordance with various aspects of the present disclosure. The WLAN 100 may include an AP 105 and multiple associated STAs 115, which may represent devices such as mobile stations, personal digital assistants (PDAs), other handheld devices, netbooks, notebook computers, tablet computers, laptops, display devices (e.g., TVs, computer monitors, etc.), printers, etc. The AP 105 and the associated STAs 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the WLAN 100. An extended network station (not shown) associated with the WLAN 100 may be connected to a wired or wireless distribution system that may allow multiple APs 105 to be connected in an ESS.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical (PHY) and media access control (MAC) layers from IEEE 802.11 and versions including, but not limited to, 802.11b, 802.11g, 802.11a, 802.11n, 802.11ac, 802.11ad, 802.11ah, 802.11aj, 802.11ax, 802.11ay, 802.11ba, etc. In other implementations, peer-to-peer connections or ad hoc networks may be implemented within WLAN 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention-based environment (e.g., carrier sense multiple access with collision avoidance (CSMA/CA)) because the STAs 115 may not refrain from transmitting on top of each other. A STA 115 whose transmissions are not identifiable, but that is within the same coverage area 110 may be known as a hidden node. CSMA/CA may be supplemented by the exchange of an RTS packet transmitted by a sending STA 115 (or AP 105) and a CTS packet transmitted by the receiving STA 115 (or AP 105). This may alert other devices within range of the sender and receiver not to transmit for the duration of the primary transmission. Thus, request to send (RTS)/clear to send (CTS) may help mitigate a hidden node problem. To prevent several devices from transmitting over the channel at the same time, each device in the WLAN 100 operates according to certain procedures that structure and organize medium access, thereby preventing interference between the devices.

The STAs 115 and/or APs 105, include transmitters configured to generate and transmit waveforms on the medium that conform to spectral masking and/or flatness attributes. The transmitted waveform is a wideband waveform. In some examples, the transmitted waveform is a contiguous wideband waveform with a center frequency $f_c$ and a bandwidth ($\beta$). In some examples, $\beta$ is 320 MHz. In other examples, the transmitted waveform is a non-contiguous wideband waveform made up of multiple bandwidths (e.g., frequency bands) separated by one or more unused subbands. In such examples, $\beta$ may be the same for each bandwidth (e.g., $\beta$ is 20, 40, 80, or 160 MHz), or may be different for some bandwidths (e.g., for a total bandwidth of 320 MHz, a first bandwidth is 160 MHz and for a second and third bandwidths $\beta$ is 80 MHz each). The spectral mask defines the shape or "skirt" of the waveform outside of the bandwidth (e.g., on the leading edge and the trailing edge). The spectral flatness attributes generally define the flatness of the waveform across the waveform bandwidth, including for subcarriers.

Broadly, the spectral mask includes rolloff portions that establish how quickly the waveform drops from a peak transmit power (defined as 0 dB relative (dBr) to the maximum spectral density of the waveform) across the bandwidth of the waveform to predefined power levels at given frequencies above and below the bandwidth. Each rolloff portion has an associated slope which defines how aggressively the power level drops. The spectral mask can include three rolloff portions, each rolloff portion having its own slope, as discussed in more detail below.

Broadly, the spectral flatness attribute defines the flatness of the bandwidth of the waveform. As previously discussed, the waveform includes multiple sub-carriers or tones (e.g., 2024 tones) that collectively form the contiguous wideband waveform. Although the tones collectively form the waveform, each tone is transmitted at a particular frequency and at a particular transmit power. In an ideal situation, every tone would be transmitted at the same power level. In reality, the power level for each subcarrier may be slightly different, and the spectral flatness attribute defines the amount of acceptable or maximum deviance in the transmit power for each tone from some value (e.g., the average power level across all the subcarriers), determined with respect to the particular region of the bandwidth the tone is located. For example, tones may include a maximum deviation of +4/−4 dB, or +4/−6 dB, or +4/−4 dB for certain subcarriers and +4/−6 dB for certain subcarriers, etc.

A STA 115-b may identify a transmission mode for an input signal. In some cases, the transmission mode may have three or more non-contiguous RF spectrum bands. A STA 115 may modulate the input signal to generate a modulated signal according to the identified transmission mode, and transmit the modulated signal at a power level to produce a transmitted signal having a spectral envelope. Identifying a transmission mode having at least three non-contiguous RF spectrum bands may allow for the STA 115 to modulate the input signal across a larger frequency range (e.g., may allow the STA 115 to generate a modulated signal according to the identified transmission mode having non-contiguous RF spectrum bands), which may improve transmission robustness (e.g., as certain regions of the larger bandwidth that includes the at least three non-contiguous RF spectrum bands may be associated with different interference conditions). Further, identifying a transmission mode having at least three non-contiguous RF spectrum bands may allow for unused subbands between each of the three non-contiguous RF spectrum bands. The unused subbands may allow for other transmissions (e.g., by other wireless devices in WLAN 100, or other wireless devices in other wireless communications systems).

In some cases, the transmission mode may have three or more non-contiguous RF spectrum bands that comprise a first RF spectrum band of 160 MHz, a second RF spectrum band of 80 MHz, and a third RF spectrum band of 80 MHz; or the first RF spectrum band of 80 MHz, the second RF spectrum band of 80 MHz, and the third RF spectrum band of 80 MHz or the first RF spectrum band of 80 MHz, the second RF spectrum band of 80 MHz, the third RF spectrum band of 80 MHz, and a fourth RF spectrum band of 80 MHz. Utilization of such non-contiguous RF spectrum bands may allow for selective PSD in certain frequency regions and reduced interference caused on certain adjacent and/or alternate channels (e.g., depending on used and unused subbands, controllable based on the transmission mode), increased bandwidth use, and overall increased system performance. A STA 115 may identify a transmission mode wherein the at least three non-contiguous RF spectrum bands have a bandwidth greater than 160 MHz, the advantage to this being extended bandwidth use, and decreased interference in adjacent and/or alternate radio spectrum bands. A STA 115 may identify a transmission mode wherein the at least three non-contiguous RF spectrum bands have a bandwidth greater than 320 MHz, the advantage to this being yet even further extended bandwidth use as well as reduced interference in adjacent and/or alternate radio spectrum bands.

The STA 115 may control the modulation of the input signal to be transmitted to maintain the spectral envelope to be within a spectral mask that is defined for the transmission mode having at least three non-contiguous RF spectrum bands. Characteristics or parameters of the spectral mask may reduce the amount of interference in neighboring bands (e.g., in unused subbands). Such interference control (e.g., identification of transmission modes with non-contiguous RF spectrum bands (e.g., unused subbands), modulation of the input signal to generate a modulated signal according to the identified transmission mode, reduced spectral leakage due to controlling the modulation for spectral mask adherence, etc.) may increase system performance (e.g., increase physical layer transfer rates, increase medium reuse for other devices, etc.).

It is to be understood that aspects of the described spectral flatness are not limited to a waveform having a particular value for $\beta$ (e.g., for a value for $\beta$ of 320 MHz). Instead, the described techniques are equally applicable, by analogy to $\beta$ of 20 MHz, 40 MHz, 80 MHz, 160 MHz, 80+80 MHz (or a non-contiguous 160 MHz waveform), 160+80 MHz, 160+ 160 MHz, 160+80+80 MHz, 3×80 MHz, 4×80 MHz, etc. without departing from the scope of the present disclosure. In some cases, waveforms having other values for $\beta$ (e.g., bandwidths of 20 MHz, 40 MHz, 80 MHz, 160 MHz, 80+80 MHz, etc.) may use spectral masks associated with 802.11ac compliance (e.g., which in some case be referred to as very high throughput (VHT)), 802.11ax compliance (which in some case be referred to as high efficiency (HE)), etc.

Figure 2:
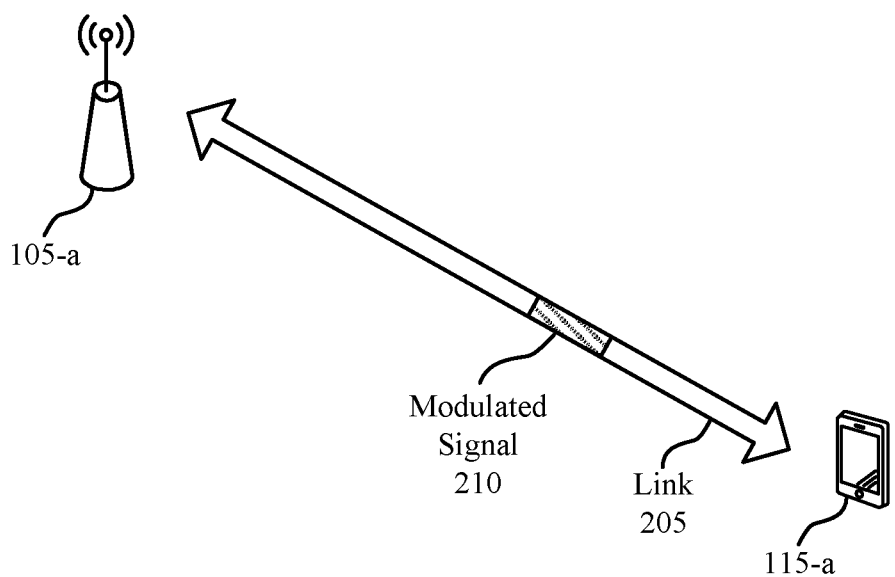
FIG. 2 illustrates an example of a WLAN that supports spectral mask and flatness for WLAN in accordance with aspects of the present disclosure.

FIG. 2 illustrates an example of a WLAN 200 that supports spectral mask and flatness for WLAN in accordance with various aspects of the present disclosure. In some examples, WLAN 200 may include an AP 105-a and a STA 115-a, each of which may implement aspects of corresponding devices as described with reference to WLAN 100. AP 105-a and STA 115-a may communicate via modulated signals 210 over a link 205. In some cases, link 205 may refer to a radio frequency spectrum band, which may include a contiguous bandwidth, or multiple non-contiguous bands of a bandwidth for a transmission mode. Modulated signals 210 may include transmitted waveforms as discussed herein. Specifically, characteristics or parameters of modulated signals 210 may impact the amount of interference in neighboring bands as discussed above. For example, a modulated signal 210 may be modulated according to a transmission mode, and the modulated signal 210 may then be transmitted at some power level to produce a transmitted signal having a spectral envelope within a spectral mask as defined in more detail with reference to FIG. 3.

The following tables provide various examples of WLAN waveform attributes, spectral mask parameters (e.g., spectral mask requirements), flatness parameters (e.g., spectral flatness requirements), etc., or combinations of these, for WLANs and/or communications as described herein. In the following tables, such examples may sometimes be referred to in terms of "types" of waveforms. For example, a type may generally refer to compliance with a protocol of one or more versions of IEEE 802.11. As used below, type 1 refers to compliance with one or more protocol of 802.11ac (which in some case be referred to as VHT). Type 2 may refer to compliance with one or more protocols of 802.11ax (which in some case be referred to as HE). Type 3 may refer to compliance with one or more protocol of non-high throughput (non-HT) duplicate protocols, etc. Type 4 may refer to a type other than Type 1, Type 2, and Type 3 (which in some case be referred to as ultra high throughput (UHT) or extremely high throughput (EHT)). Note that in the following tables, FFT refers to a Fast Fourier Transform, and pt and pts refers to a point or points (e.g., a number of carriers). Further, UHT may refer to ultra high throughput, and EHT may refer to extremely high throughput. 1× refers to a multiplier of a tone spacing or symbol duration. For example 2× may twice the number of tones per spacing and twice the symbol duration of 1×, and 4× may have twice the number of tones per spacing and twice the symbol duration of 2×. In one example, 1× may use a tone spacing of 312.5 kHz, 2× may use a tone spacing of 156.25 kHz, and 4× may use a tone spacing of 78.125 kHz).

Table 2.1 provides a summary of examples for subband tone plan designs for different bandwidths, and an entry in Table 2.1 refers to a particular row in Table 2.2 below. An entry in Table 2.1 may apply to a total bandwidth transmission or may apply to a subband in a transmission mode that utilizes such subband. For example, the 80 MHz column may apply to an 80 MHz transmission with a total bandwidth of 80 MHz and/or the 80 MHz column may apply to the 80 MHz subband in 160+2×80 MHz or 4×80 Mhz transmission modes with a total bandwidth of 320 MHz.

Entries of Table 2.1 may indicate one or more tone plan designs, while Table 2.2 may give spectral mask parameters for the different tone plan designs of Table 2.1. For example, an interim spectral mask for 80 MHz using a Type 1, 1× symbol duration is referenced as a 'Type 1-80' tone plan design in Table 2.1, and the 'Type 1-80' tone plan design may be associated with spectral mask parameters shown in the 'TYPE1-80' row of Table 2.2.

Table 2.2 provides examples of spectral mask parameters. As shown, for a single bandwidth (e.g., β), differences in mask parameters may arise between Type 1 and Type 2. For example, Type 1 may use a 1× symbol duration or tone plan (e.g., a tone spacing of 312.5 kHz). Type 2 may use a 4× symbol duration or tone plan (e.g. a tone spacing of 78.125 kHz), where the spectral masks may be derived from Type 1 (e.g., 1×) spectral masks with downclocking and guard band parameters. For example, a general rule to derive an 80+80 MHz spectral mask may be the same from both Type 1 and Type 2. Transmission modes (e.g., 20, 40, 80, 160, or 80+80 MHz transmission modes) may include preamble puncturing. If EHT uses 1× symbol duration, Type 1 spectral mask parameters may be used. If EHT uses 4× symbol duration, Type 2 spectral mask parameters may be used. If EHT uses 2× symbol duration (e.g., a tone spacing of 156.25 kHz) and tone plan design comes from Type 1, tone plans may be downclocked by 2, the guard band size may be similar to Type 2 tone plans, and may follow Type 2 spectral mask parameters. If EHT uses 2× symbol duration (e.g., a tone spacing of 156.25 kHz) and tone plan design comes from Type 2, tone plans may be upclocked by 2, the guard band size may be similar to Type 1 tone plans, and may follow Type 1 spectral mask parameters. For 80+80 MHz Type 1/Type 2 rules may apply. Contiguous 320 MHz spectral mask parameters, for 1×, may be extended from 1× spectrum mask parameters in Type 1 (e.g., with 2 MHz transitions between 0 dBr and −20 dBr). Contiguous 320 MHz spectral mask parameters, for 4×, may be extended from 4× spectrum mask parameter in Type 2 (e.g., with 1 MHz transition between 0 dBr and −20 dBr). Contiguous 320 MHz spectral mask parameters, for 2×, if tone plan design comes from Type 1 tone plans downclocked by 2, the

TABLE 2.1

| Symbol Duration | 20 MHz (64 FFT) | 40 MHz (128 FFT) | 80 MHz (256 FFT) | 160 MHz (512 FFT) | 320 MHz (1024 FFT) |
|---|---|---|---|---|---|
| 1× (TYPE 1-based) | TYPE 1-20 | TYPE 1-40 | TYPE 1-80 | TYPE 1-160 | (1) Duplicate two TYPE 1-160 (2) TYPE 1-20/40/80 Combo (3) Duplicate sixteen TYPE 1-20 |
| 1× (TYPE 2-based) | N/A | N/A | TYPE 2-20 upclocked by 4 | (1) Duplicate two TYPE 2-20 upclocked by 4 (2) TYPE 2-40 upclocked by 4 | (1) Duplicate four TYPE 2-20 upclocked by 4 (2) TYPE 2-80 upclocked by 4 |
| 1× (TYPE 4-based) | 64-pt Design | 128-pt Design | 256-pt Design | 512-pt Design | 1024-pt Design |
| 2× (TYPE 1-based) | TYPE 1-40 downclocked by 2 | TYPE 1-80 downclocked by 2 | TYPE 1-160 downclocked by 2 | Duplicate two TYPE 1-160 downclocked by 2 | Duplicate four TYPE 1-160 downclocked by 2 |
| 2× (TYPE 2-based) | N/A | TYPE 2-20 upclocked by 2 | TYPE 2-40 upclocked by 2 | TYPE 2-80 upclocked by 2 | TYPE 2-160 upclocked by 2 |
| 2× (TYPE 4-based) | 128-pt design | 256-pt design | 512-pt design | 1024-pt design | 2048-pt design |
| 4× (TYPE 2-based) | TYPE 2-20 | TYPE 2-40 | TYPE 2-80 | (1) TYPE 2-160; or (2) Modified tone plans based on TYPE 2-160 | (1) Duplicate two TYPE 2-160; or (2) Modified tone plans based on TYPE 2-160 |
| 4× (TYPE 4-based) | 256-pt design | 512-pt design | 1024-pt design | 2048-pt design | 4096-pt design | guard band size may be similar to the 4× tone plans, could follow the above 4× design, using 1 MHz transition. Contiguous 320 MHz spectral mask parameters, for 2×, if tone plan design comes from Type 2 tone plans upclocked by 2, the guard band size may be similar to the 1× tone plans, could follow the above 1× design, using a 2 MHz transition. Other 3 non-contiguous modes (e.g., 2×160 MHz, 160+2×80 MHz, 4×80 MHz modes) may generalize the rule of deriving non-contiguous 80+80 MHz mask in Type 1/Type 2. In some cases, Type 1 or Type 2 spectral mask parameters may be used regardless of tone plan (e.g., Type 1 or Type 2 spectral mask parameters may be selected independently from the tone spacing). For example, in some cases, if EHT uses 1× symbol duration, Type 2 spectral mask parameters may be used, and if EHT uses 4× symbol duration, Type 1 spectral mask parameters may be used.

For the rows in Table 2.2 (corresponding to a particular type (Type 1, Type 2, Type 4, etc.), bandwidth, and tone plan design (1×, 2×, 4×, etc.)), the interim transmit spectral mask for the frequency offsets between the frequency offset for 0 dBr and the frequency offset for −20 dBr may be linearly interpolated in dB domain from the frequency offset for 0 dBr and the frequency for −20 dBr. Similarly, the interim transmit spectral mask for the frequency offsets between the frequency offset for −20 dBr and the frequency offset for −28 dBr may be linearly interpolated in dB domain from the frequency offset for −20 dBr and the frequency for −28 dBr. And, the interim transmit spectral mask for the frequency offsets between the frequency offset for −28 dBr and the frequency offset for −40 dBr may be linearly interpolated in dB domain from the frequency offset for −28 dBr and the frequency for −40 dBr.

For example, for Type2-20 in Table 2.2, the interim transmit spectral mask for frequency offsets between 9.75 and 10.5 MHz, 10.5 and 20 MHz, and 20 and 30 MHz shall be linearly interpolated in dB domain from the requirements for 9.75 MHz, 10.5 MHz, 20 MHz, and 30 MHz frequency offsets.

TABLE 2.2

| | BW | TYPE 1, 1× | | | |
|---|---|---|---|---|---|
| TYPE1 | (MHz) | 0 dBr | −20 dBr | −28 dBr | −40 dBr |
| TYPE1-20 | 20 | ±9 | ±11 | ±20 | ±30 |
| TYPE1-40 | 40 | ±19 | ±21 | ±40 | ±60 |
| TYPE1-80 | 80 | ±39 | ±41 | ±80 | ±120 |
| TYPE1-160 | 160 | ±79 | ±81 | ±160 | ±240 |
| | BW | TYPE 2, 4× | | | |
| TYPE2 | (MHz) | 0 dBr | −20 dBr | −28 dBr | −40 dBr |
| TYPE2-20 | 20 | ±9.75 | ±10.5 | ±20 | ±30 |
| TYPE2-40 | 40 | ±19.5 | ±20.5 | ±40 | ±60 |
| TYPE2-80 | 80 | ±39.5 | ±40.5 | ±80 | ±120 |
| TYPE2-160 | 160 | ±79.5 | ±80.5 | ±160 | ±240 |
| | BW | TYPE4, 1× or 2× | | | |
| TYPE4 (1× or 2×) | (MHz) | 0 dBr | −20 dBr | −28 dBr | −40 dBr |
| TYPE4-20 (1× or 2×) | 20 | ±9 | ±11 | ±20 | ±30 |
| TYPE4-40 (1× or 2×) | 40 | ±19 | ±21 | ±40 | ±60 |
| TYPE4-80 (1× or 2×) | 80 | ±39 | ±41 | ±80 | ±120 |
| TYPE4-160 (1× or 2×) | 160 | ±79 | ±81 | ±160 | ±240 |
| TYPE4-320 (1× or 2×) | 320 | ±159 | ±161 | ±320 | ±480 |

TABLE 2.2-continued

| | BW | TYPE4, 2× or 4× | | | |
|---|---|---|---|---|---|
| TYPE4 (2× or 4×) | (MHz) | 0 dBr | −20 dBr | −28 dBr | −40 dBr |
| TYPE4-20 (2× or 4×) | 20 | ±9.75 | ±10.5 | ±20 | ±30 |
| TYPE4-40 (2× or 4×) | 40 | ±19.5 | ±20.5 | ±40 | ±60 |
| TYPE4-80 (2× or 4×) | 80 | ±39.5 | ±40.5 | ±80 | ±120 |
| TYPE4-160 (2× or 4×) | 160 | ±79.5 | ±80.5 | ±160 | ±240 |
| TYPE4-320 (2× or 4×) | 320 | ±159.5 | ±160.5 | ±320 | ±480 |

In some cases, the spectral masks given in Table 2.2 may be associated with dBm limits such that the transmit spectrum (e.g., spectral envelope) may not exceed the maximum of the interim transmit spectral mask and some dBm/MHz value at any frequency offset. For example, for a TYPE1-20 spectral mask, the transmit spectrum may not exceed the maximum of the TYPE1-20 spectral mask and −53 dBm/MHz at any frequency offset (e.g., −40 dBr spectrum level may be above −53 dBm/MHz). As another example, for a TYPE1-40 spectral mask, the transmit spectrum may not exceed the maximum of the TYPE1-40 spectral mask and −56 dBm/MHz at any frequency offset greater than 19 MHz (e.g., −40 dBr spectrum level may be above −56 dBm/MHz). As another example, for a TYPE1-80 spectral mask, the transmit spectrum may not exceed the maximum of the TYPE1-80 spectral mask and −59 dBm/MHz at any frequency offset (e.g., −40 dBr spectrum level may be above −59 dBm/MHz). As another example, for a TYPE1-160 spectral mask, the transmit spectrum may not exceed the maximum of the TYPE1-160 spectral mask and −59 dBm/MHz at any frequency offset (e.g., −40 dBr spectrum level may be above −59 dBm/MHz). As another example, for a TYPE2-20 spectral mask, the transmit spectrum may not exceed the maximum of the TYPE2-20 spectral mask and −53 dBm/MHz at any frequency offset (e.g., −40 dBr spectrum level may be above −53 dBm/MHz). As another example, for a TYPE2-40 spectral mask, the transmit spectrum may not exceed the maximum of the TYPE2-40 spectral mask and −56 dBm/MHz at any frequency offset greater than 19.5 MHz (e.g., −40 dBr spectrum level may be above −56 dBm/MHz). As another example, for a TYPE2-80 spectral mask, the transmit spectrum may not exceed the maximum of the TYPE2-80 spectral mask and −59 dBm/MHz at any frequency offset (e.g., −40 dBr spectrum level may be above −59 dBm/MHz). As another example, for a TYPE2-160 spectral mask, the transmit spectrum may not exceed the maximum of the TYPE2-160 spectral mask and −59 dBm/MHz at any frequency offset (e.g., −40 dBr spectrum level may be above −59 dBm/MHz).

As another example, for an 80+80 MHz spectral mask, the overall transmit spectral mask may be constructed as 80 MHz spectral masks being placed on each of the two 80 MHz segments. For each frequency at which both of the 80 MHz interim spectral masks have values greater than −40 dBr and less than −20 dBr, the sum of the two interim mask values (e.g., summed in the linear domain) may be taken as the overall spectral mask value. Next, for each frequency at which neither of the two 80 MHz interim masks have values greater than or equal to −20 dBr and less than or equal to 0 dBr, the higher value of the two interim masks may be taken as the overall interim spectral value. For any frequency region where the mask value has not been defined yet, linear interpolation (e.g., in dB domain) between the nearest two frequency points with the interim spectral mask value defined may be used to define the interim spectral mask value. The transmit spectrum may not exceed the maximum of the interim transmit spectrum mask and −59 dBm/MHz at any frequency offset.

Further, for each bandwidth, the frequency offsets at −28 dBr and −40 dBr may be fixed. However, the frequency offsets from the transition period (e.g., 0 dBr and −20 dBr) may be adjusted by a small value if the bandwidth resolution in measurement is changed (e.g., as further described below with reference to FIG. 5).

Table 2.3 may include examples of spectral flatness parameters, and an entry in the table 2.3 refers to a particular row in Table 2.4 below. In some cases, Type 1 and Type 2 may be associated with spectral flatness parameters, for example, for 20 MHz, 40 MHz, 80 MHz, 160 MHz, etc. In non-contiguous 80+80 MHz transmission modes, each frequency segment (of width β) may follow parameters for 80 MHz. EHT spectral flatness parameters for contiguous bandwidth modes may include 20 MHz, 40 MHz, 80 MHz, 160 MHz, and 320 MHz. EHT spectral flatness parameters may depend on a tone plan and symbol duration. For non-contiguous bandwidths, EHT spectral flatness parameters may include spectral flatness parameters for non-contiguous 80+80 MHz, 2×160 MHz, 160+2×80 MHz, 4×80 MHz, etc. Each frequency band may follow spectral flatness parameters for the size of the subband (a frequency segment of width β).

TABLE 2.3

| Symbol Duration | 20 MHz | 40 MHz | 80 MHz | 160 MHz | 320 MHz |
|---|---|---|---|---|---|
| 1x (TYPE 1-based) | Type 1-20 MHz | Type 1-40 MHz | Type 1-40 MHz | Type 1-160 MHz | Type 1-320 MHz (1x symbol duration) |
| 1x (TYPE 2-based) | N/A | N/A | Type 2-20 MHz | Type 2-40 MHz | Type 2-80 MHz |
| 2x (TYPE 1-based) | Type 1-40 MHz | Type 1-80 MHz | Type 1-160 MHz | Type 1-160 MHz (2x symbol duration) | Type 1-320 MHz (2x symbol duration) |
| 2x (TYPE 2-based) | N/A | Type 2-20 MHz | Type 2-40 MHz | Type 2-80 MHz | Type 2-160 MHz |
| 4x | Type 2-20 MHz | Type 2-40 MHz | Type 2-80 MHz | Type 2-160 MHz | Type 2-320 MHz (4x symbol duration) |

Table 2.4 may include examples of spectral flatness parameters, including averaging subcarrier indices, tested subcarrier indices, and maximum deviation. For 2×EHT 160 (e.g., Type 1 based) spectral flatness may assume the tone plan is a duplication of two Type 1-160 MHz (e.g., duplication of four Type 1-80). The populated tone indices may belong to [−506:−386, −382:−262, −250:−130, −126:−6, 6:126, 130:250, 262:382, 386:506]. Further, an outer most INNER subcarrier=floor(84*506/122)=348 and an inner most INNER subcarrier=(512−348)/2+2=84. The same may hold for a 1×EHT 320 (e.g., Type 1 based) spectral flatness. For 4×EHT 320 spectral flatness may assume the tone plan is duplication of two Type 2-160 (e.g., duplication of four Type 2-80). The populated tone indices may belong to [−2036:−1539, −1533:−1036, −1012:−515, −509:−12, 12:509, 515:1012, 1036:1533, 1539:2036]. Further, an outer most INNER subcarrier=floor(168*2036/244)=1401, and an inner most INNER subcarrier=ceil((2048−1401)/2)+2=326. For 2×EHT 320 (e.g., Type 1 based) spectral flatness parameters, it may be assumed the tone plan is duplication of four Type 1-160 (e.g., duplication of eight Type 1-80). The populated tone indices may belong to [−1018:−898, −894:−774, −762:−642, −638:−518, −506:−386, −382:−262, −250:−130, −126:−6, 6:126, 130:250, 262:382, 386:506, 518:638, 642:762, 774:894, 898:1018]. The outer most INNER subcarrier=floor(84*1018/122)=700, and the inner most INNER subcarrier=(1024−700)/2+2=164.

TABLE 2.4

| Type | Bandwidth of transmission mode (MHz) | Averaging subcarrier indices (inclusive) | Tested subcarrier (tone) indices (inclusive) | Maximum deviation (dB) |
|---|---|---|---|---|
| Type 1-20 | 20 | −16 to −1 and +1 to +16 | −16 to −1 and +1 to +16 | ±4 |
|  |  |  | −28 to −17 and +17 to +28 | +4/−6 |
| Type 1-40 | 40 | −42 to −2 and +2 to +42 | −42 to −2 and +2 to +42 | ±4 |
|  |  |  | −58 to −43 and +43 to +58 | +4/−6 |
| Type 1-80 | 80 | −84 to −2 and +2 to +84 | −84 to −2 and +2 to +84 | ±4 |
|  |  |  | −122 to −85 and +85 to +122 | +4/−6 |
| Type 1-160 | 160 | −172 to −130, −126 to −44, +44 to +126, and +130 to +172 | −172 to −130, −126 to −44, +44 to +126, and +130 to +172 | ±4 |
|  |  |  | −250 to −173, −43 to −6, +6 to +43, and +173 to +250 | +4/−6 |
|  |  |  | −1018 to −898, −894 to −774, −762 to −701, −163 to −130, −126 to −6, 6 to 126, 130 to 163, 701 to 762, 774 to 894, 898 to 1018 | +4/−6 |
| Type 3-40 | 40 | −42 to −33, −31 to −6, +6 to +31, and +33 to +42 | −42 to −33, −31 to −6, +6 to +31, and +33 to +42 | ±4 |
|  |  |  | −43 to −58 and +43 to +58 | +4/−6 |
| Type 3-80 | 80 | −84 to −70, −58 to −33, −31 to −6, +6 to +31, +33 to +58, +70 to +84 | −84 to −70, −58 to −33, −31 to −6, +6 to +31, +33 to +58, +70 to +84 | ±4 |
|  |  |  | −122 to −97, −95 to −85 and +85 to +95, +97 to +122 | +4/−6 |
| Type 3-160 | 160 | −172 to −161, −159 to −134, −122 to −97, −95 to −70, −58 to −44, +44 to +58, +70 to +95, +97 to +122, +134 to +159, +161 to +172 | −172 to −161, −159 to −134, −122 to −97, −95 to −70, −58 to −44, +44 to +58, +70 to +95, +97 to +122, +134 to +159, +161 to +172 | ±4 |
|  |  |  | −250 to −225, −223 to −198, −186 to −173, −43 to −33, −31 to −6, +6 to +31, +33 to +43, +173 to +186, +198 to +223, +225 to +250 | +4/−6 |
| Type 2-20 | 20 | −84 to −2 and +2 to +84 | −84 to −2 and +2 to +84 | ±4 |
|  |  |  | −122 to −85 and +85 to +122 | +4/−6 |
| Type 2-40 | 40 | −168 to −3 and +3 to +168 | −168 to −3 and +3 to +168 | ±4 |
|  |  |  | −244 to −169 and +169 to +244 | +4/−6 |
| Type 2-80 | 80 | −344 to −3 and +3 to +344 | −344 to −3 and +3 to +344 | ±4 |
|  |  |  | −500 to −345 and +345 to +500 | +4/−6 |
| Type 2-160 | 160 | −696 to −515, −509 to −166, +166 to +509, and +515 to +696 | −696 to −515, −509 to −166, +166 to +509, and +515 to +696 | ±4 |
|  |  |  | −1012 to −697, −165 to −12, +12 to +165, and +697 to +1012 | +4/−6 |
|  |  |  | −2036 to −1539, −1533 to −1402, −325 to −12, +12 to +325, +1402 to +1533, and +1539 to +2036 | +4/−6 |
| Type 4-160 (2x) | 160 (2x symbol duration) | −348 to −262, −250 to −130, −126 to −84, +84 to +126, +130 to +250, and +262 to +348 | −348 to −262, −250 to −130, −126 to −84, +84 to +126, +130 to +250, and +262 to +348 | ±4 |
|  |  |  | −506 to −386, −382 to −349, −83 to −6, +6 to +83, +349 to +382, and +386 to +506 | +4/−6 |
| Type 4-320 (1x) | 320 (1x symbol duration) | −348 to −262, −250 to −130, −126 to −84, +84 to +126, +130 to +250, and +262 to +348 | −348 to −262, −250 to −130, −126 to −84, +84 to +126, +130 to +250, and +262 to +348 | ±4 |
|  |  |  | −506 to −386, −382 to −349, −83 to −6, +6 to +83, +349 to +382, and +386 to +506 | +4/−6 |
| Type 4-320 (2x) | 320 (2x symbol duration) | −700 to −642, −638 to −518, −506 to −386, −382 to −262, −250 to −164, 164 to 250, 262 to 382, 386 to 506, 518 to 638, and 642 to 700 | −700 to −642, −638 to −518, −506 to −386, −382 to −262, −250 to −164, 164 to +250, +262 to +382, +386 to +506, +518 to +638, and +642 to +700 | ±4 |
|  |  |  | −1018 to −898, −894 to −774, −762 to −701, −163 to −130, −126 to −6, +6 to +126, +130 to +163, +701 to +762, +774 to +894, +898 to +1018 | +4/−6 |
| Type 4-320(4x) | 320 (4x symbol duration) | −1401 to −1036, −1012 to −515, −509 to −326, +326 to +509, +515 to +1012, | −1401 to −1036, −1012 to −515, −509 to −326, +326 to +509, +515 to +1012, and +1036 to +1401 | ±4 |
|  |  |  | −2036 to −1539, −1533 to −1402, −325 to −12, +12 to +325, +1402 to | +4/−6 |

TABLE 2.4-continued

| Type | Bandwidth of transmission mode (MHz) | Averaging subcarrier indices (inclusive) | Tested subcarrier (tone) indices (inclusive) | Maximum deviation (dB) |
|---|---|---|---|---|
| | | and +1036 to +1401 | +1533, and +1539 to +2036 | |

In addition to or as alternative to one or more of the spectral mask and flatness requirements described above, STA 115-a and/or AP 105-a may implement, for certain combinations for values for β (e.g., bandwidths of 20 MHz, 40 MHz, 80 MHz, 160 MHz, 80+80 MHz, etc.) spectral masks and/or spectral flatness associated with compliance with one or more protocols of 802.11ac (e.g., which in some case be referred to as very high throughput (VHT)) or 802.11ax (which in some case be referred to as high efficiency (HE)). For example, for values for β of 20 MHz, 40 MHz, 80 MHz, 160 MHz, or 80+80 MHz, STA 115-a and/or AP 105-a may implement spectral masks and/or spectral flatness associated with compliance with one or more protocols of 802.11ac or 802.11ax, while for values for β of 240 MHz or 320 MHz, STA 115-a and/or AP 105-a may implement one or more of the spectral masks and/or spectral flatness described herein that are not associated with compliance with one or more protocols of 802.11ac or 802.11ax.

Figure 3:
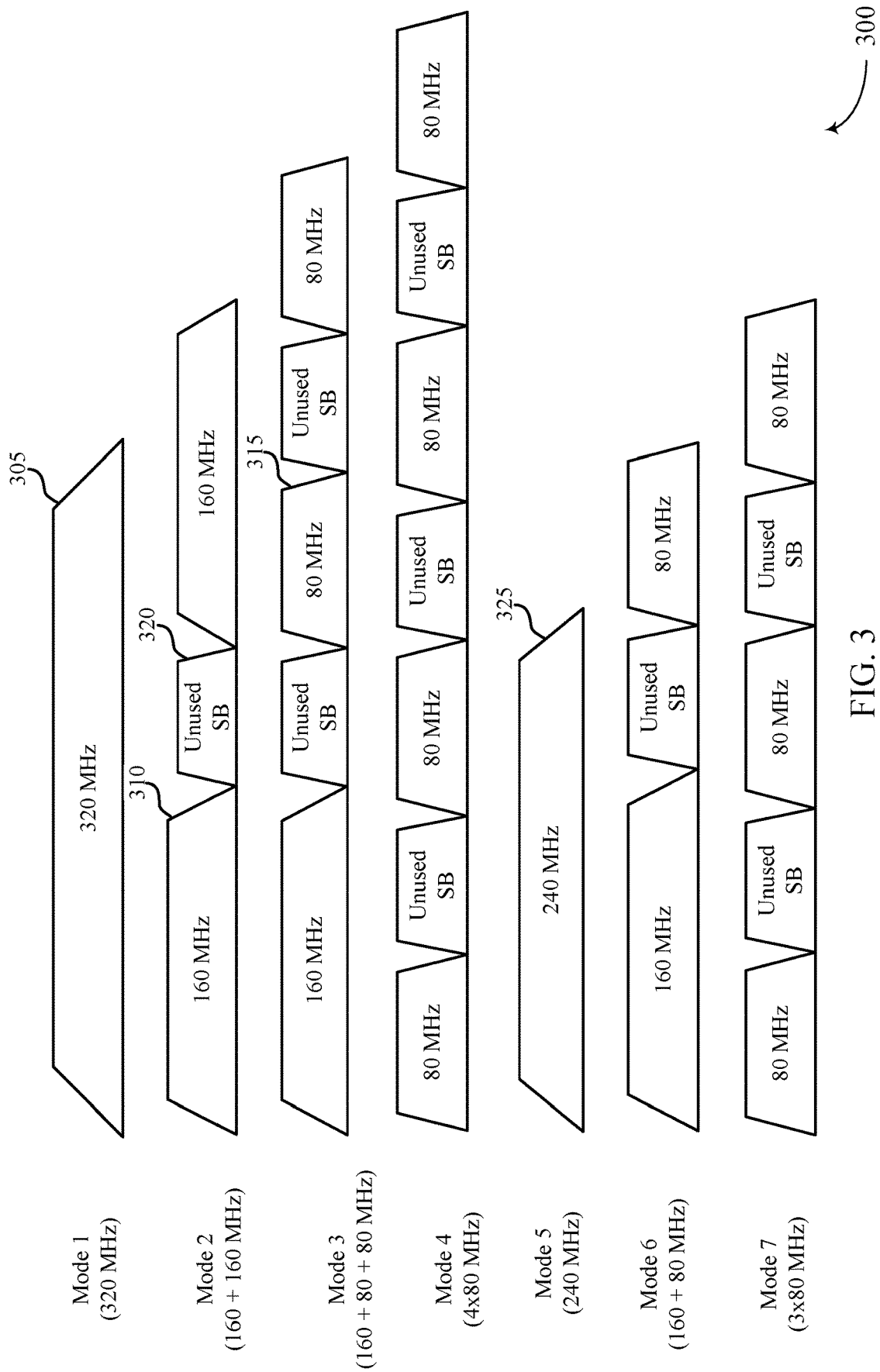
FIG. 3 illustrates an examples of transmission modes that support spectral mask and flatness for WLAN in accordance with aspects of the present disclosure.

FIG. 3 illustrates an examples of transmission modes that support spectral mask and flatness for WLAN in accordance with various aspects of the present disclosure. In some examples, such transmission modes may implement aspects of WLAN 100 and WLAN 200 as described with reference to FIGS. 1 and 2. For example, FIG. 3 may illustrate seven transmission modes (e.g., 'Mode 1,' 'Mode 2,' 'Mode 3,' 'Mode 4,' 'Mode 5,' 'Mode 6', and 'Mode 7'). Some of such transmission modes may be associated with increased total bandwidths, and may be selected based on channel availability. Further, a spectral mask may be defined separately for each transmission mode.

Mode 1 (e.g., 320 MHz) may include a single contiguous 320 MHz frequency band 305. Example spectral masks that may be used for such a transmission mode (e.g., Mode 1) are further discussed below with reference to FIGS. 4 and 5. Mode 2 (e.g., 160+160 MHz) may include two non-contiguous 160 MHz frequency bands 310, separated by an unused subband 320. In some cases, such a mode may be referred to as two non-contiguous 160 MHz frequency bands 310. Mode 3 (e.g., 160+80+80 MHz) may include three disjoint frequency bands: a contiguous 160 MHz frequency band 310, and two other contiguous 80 MHz frequency bands 315, each of the three frequency bands separated by an unused subband 320. In Mode 3, the order of the 160 MHz frequency band 310 and the two 80 MHz frequency bands 315 may be in any order (e.g., the shown order of 160 MHz frequency band 310 followed by the two 80 MHz frequency bands 315 is for illustrative purposes only). In another example, an order of 80-160-80 may be used. In yet another example, an order of 80-80-160 may be used. Mode 4 (e.g., 4×80 MHz) may include four 80 MHz frequency bands 315, each separated by an unused subband 320. An example spectral mask that may be used for such a transmission mode (e.g., Mode 4) is further discussed below with reference to FIG. 5. Mode 5 (e.g., 240 MHz) may include a single contiguous 240 MHz frequency band 325. Example spectral masks that may be used for such a transmission mode (e.g., Mode 5) are further discussed below with reference to FIGS. 6 and 7. Mode 6 (e.g., 160+80 MHz) may include a non-contiguous 160 MHz frequency band 310 and 80 MHz frequency band 315, where the 160 MHz frequency band 310 and the 80 MHz frequency band 315 may be separated by an unused subband 320. In Mode 6, the order of the 160 MHz frequency band 310 and the 80 MHz frequency band 315 may be in any order (e.g., the shown order of 160 MHz frequency band 310 followed by the 80 MHz frequency band 315 is for illustrative purposes only). In another example, an order of 80-160 may be used. Mode 7 (e.g., 3×80 MHz) may include three 80 MHz frequency bands 315, each separated by an unused subband 320.

Modes 1, 2, 3, and 4 may be associated with a total bandwidth of 320 MHz, and Modes 5, 6 and 7 may be associated with a total bandwidth of 240 MHz. Note that for all transmission modes illustrated in FIG. 3, unused subbands 320 may be of different, or in some cases the same, bandwidth as the 320 MHz frequency bands 305, the 240 MHz frequency bands 325, the 160 MHz frequency bands 310, or the 80 MHz frequency bands 315. For example, the unused subbands may be a 20 MHz bandwidth, a 40 MHz bandwidth, or a much higher bandwidth that is a multiple of 20 MHz, or a combination of these, in some examples. Further, other examples of transmission modes may be utilized for other bandwidths.

Figure 4:
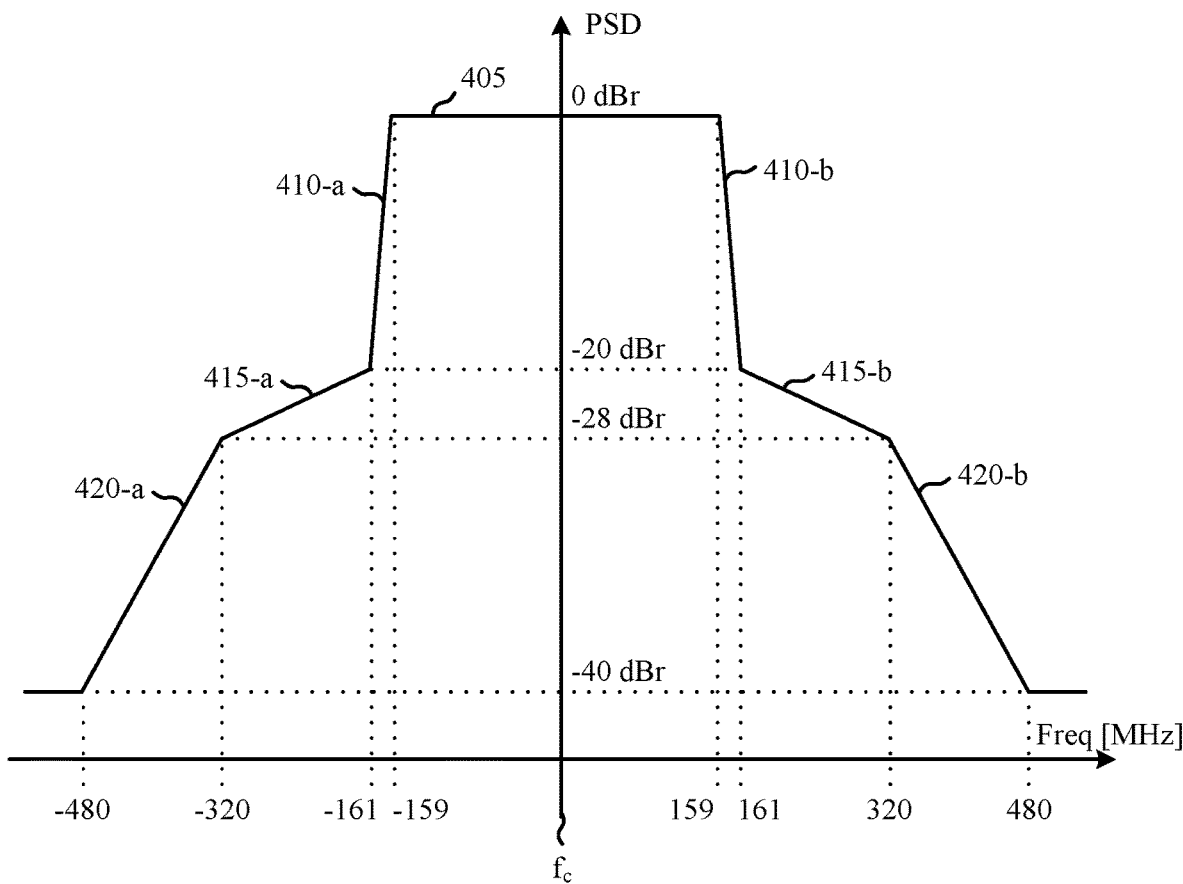
FIGS. 4 through 8 illustrate examples of spectral masks that support spectral mask and flatness for WLAN in accordance with aspects of the present disclosure.

FIG. 4 illustrates an example of a spectral mask 400 that supports spectral mask and flatness for WLAN in accordance with various aspects of the present disclosure. In some examples, spectral mask 400 may be implemented by a wireless communication device, such as a STA 115 and/or an AP 105 described with reference to WLAN 100 and WLAN 200 of FIGS. 1 and 2. The spectral mask 400 may be defined for a contiguous wideband waveform having a bandwidth of β. The spectral mask 400 includes a 0 dBr bandwidth 405, a first rolloff portion 410, a second rolloff portion 415, and a third rolloff portion 420. In some cases, spectral mask 400 may be used for 1× and/or 2× symbol durations, as discussed herein. Further, a transmission requirement may be that the transmit spectrum may not exceed the maximum of the interim transmit spectrum mask and −59 dBm/MHz at any frequency offset (e.g., FIG. 4 may illustrate an example of the resulting overall spectral mask 400 when the −40 dBr spectrum level is above −59 dBm/MHz).

In some aspects, the spectral mask 400 may be defined for a β value of 320 MHz (e.g., for the transmission of a 320 MHz mask packet layer convergence protocol (PLCP) protocol data unit (PPDU)). The spectral mask 400 may define a 0 dBr bandwidth of 318 MHz (a 159 MHz frequency offset, which includes both +159 MHz and −159 MHz from the center frequency $f_c$), −20 dBr at 161 MHz frequency offset, −28 dBr at 320 MHz frequency offset, and −40 dBr at 480 MHz frequency offset and above. The spectral mask 400 for frequency offsets in between 159 and 161 MHz may be linearly interpolated in dB domain from the requirements for 159 and 161 MHz frequency offsets. The spectral mask 400 for frequency offsets in between 161 and 320 MHz may be linearly interpolated in dB domain from the requirements for 161 and 320 MHz frequency offsets. The spectral mask 400 for frequency offsets in between 320 and 480 MHz may be linearly interpolated in dB domain from the requirements for 320 and 480 MHz frequency offsets.

For new values of β (e.g., where $\beta_{new}$ is 160 MHz, 480 MHz, 640 MHz, etc.), frequency values illustrated of spectral mask 400 may be modified (e.g., each frequency value of the horizontal axis may be multiplied by $$\frac{\beta_{new}}{320}).$$

In other examples, certain of the frequency values of the horizontal axis may be multiplied by $$\frac{\beta_{new}}{320},$$

while other frequency values may maintain the offset from β, but newly offset from $\beta_{new}$. For example, the offsets for −40 dBr and −28 dBr may be multiplied by $$\frac{\beta_{new}}{320},$$

while the offsets from the center frequency $f_c$ for −20 dBr may be offset from $$\frac{\beta_{new}}{2}$$

by a fixed value (e.g, $$\frac{\beta_{new}}{2}$$

+n, where n may be 0.5, 1, or another value, for example less than 2 MHz) and the offsets from the center frequency $f_c$ for 0 dBr may be offset from $$\frac{\beta_{new}}{2}$$

by a fixed value (e.g, $$\frac{\beta_{new}}{2} - m,$$

where m may be 0.5, 1, or another value, for example a value less than 2 MHz). In some cases, the values of m and n may be selected based on the tone spacing or symbol duration (e.g., whether 1×, 2×, or 4×). For example, the values of m and n may be higher for a 1× tone spacing, and lower for a 4× tone spacing. In some cases, a spectral mask (e.g., spectral mask 400) may be used regardless of tone spacing (e.g., β, the values of m and n, etc., may be selected independently from the tone plan or tone spacing).

In some examples, the frequency offsets associated with different rolloff points (e.g., the −20 dBr, −28 dBr, and −40 dBr points) may be adjusted higher or lower to suit a particular application of the principles described herein. Similarly, the defined dBr values at each point can be adjusted higher or lower to suit a particular application of the principles described herein. In some aspects, there may be thresholds for the maximum values of the frequency offsets and defined dBr values for a transmit spectrum. In one example, for a 20 MHz mask PPDU of HE format, the transmit spectrum may not exceed the maximum of the interim transmit spectral mask and −53 dBm/MHz at any frequency offset. In another example, for a 40 MHz mask PPDU of HE format, the transmit spectrum may not exceed the maximum of the interim transmit spectral mask and −56 dBm/MHz at any frequency offset. For an 80 MHz, 160 MHz, or 80+80 MHz mask PPDU of HE format, the transmit spectrum may not exceed the maximum of the interim transmit spectral mask and −59 dBm/MHz at any frequency offset.

In some aspects, β defines the bandwidth of the waveform and is measured with respect to the center frequency, $f_c$. The β may be 320 MHz, and the 320 MHz is generally defined as +/−160 MHz (e.g., 160 MHz above $f_c$ and 160 MHz below $f_c$). The β may be associated with a tone index. The tone index is may be function of the β (and/or of the bandwidth 405) divided by the number of tones (or subcarriers) that are available and/or selected for use in the β or bandwidth 405.

The bandwidth 405 conforms to spectral flatness attributes. For example, the bandwidth 405 may be divided into multiple regions, such as inner, intermediate, and outer regions, where each region includes associated tones (e.g., associated tones of a region comprising a set of subcarriers). Each tone within a region may be transmitted at a power level conforming to a maximum deviation for the region. The spectral flatness attribute of the bandwidth 405 may provide for an average transmit power for tones across the bandwidth 405. As is understood, the actual transmit power of the average transmit power for tones across the bandwidth 405 varies depending upon various conditions, such as channel conditions, propagation distance, etc. For reference purposes, the average transmit power for tones across the bandwidth 405 is generally referred to as a 0 dBr transmit power.

Generally, the spectral flatness attributes can be a function of the local oscillator (LO) leakage of the transmitter. For example, the transmit LO leakage can conform to the described spectral flatness attributes for all β and, in some aspects, for all PPDU formats (e.g., HT, VHT, HE, EHT, etc.).

In some aspects, wireless devices may communicate using orthogonal frequency division multiple access (OFDMA) techniques and the 20 MHz, 40 MHz, 80 MHz, 160 MHz, or 80+80 MHz bandwidth may be divided into multiple resource units (RUs). As an example, some wireless devices may communicate using a first set of RUs and other wireless devices may communicate using a second set of RUs. As such, spectral flatness may be tested on used RUs and the averaging subcarrier indices and tested subcarrier indices may be equal to the tone indices in the used RU being tested. In some examples, the maximum allowed deviation of the transmit power associated with a set of tones (or subcarriers) in the RU being tested may be +4/−6 dB.

The spectral mask 400 also includes first rolloff portion 410, second rolloff portion 415, and third rolloff portion 420, that define the 'skirt' of the spectral mask. The spectral mask 400 includes a skirt on the leading edge (e.g., frequencies below and approaching $f_c$) as well as a skirt on the trailing edge (e.g., frequencies above and departing from $f_c$). For ease of reference, the rolloff portions for the leading edge are denoted as 410-*a*, 415-*a*, and 420-*a*, and the rolloff portions for the trailing edge are denoted as 410-*b*, 415-*b*, and 420-*b*. It is to be understood that the spectral mask 400 is symmetrical and therefore the leading and trailing edge skirts have similar attributes.

The first rolloff portion 410 generally defines the first power dropoff portion of the spectral mask 400 from the 0 dBr power level. The first rolloff portion 410 includes a 2 MHz bandwidth that is centered at the outer edges of the β, e.g., at $(f_c+0.5\beta)$ and at $(f_c-0.5\beta)$. When β is 320 MHz, the bandwidth of the first rolloff portion 410 is centered at +/−160 MHz from $f_c$ and the 2 MHz bandwidth spans between 159 MHz and 161 MHz above and below $f_c$. The first rolloff portion has a power dropoff from 0 dBr to −20 dBr. This defines an associated slope of the first rolloff portion 410.

The second rolloff portion 415 generally defines the second power dropoff portion of the spectral mask 400 from the −20 dBr power level to the −28 dBr power level. The second rolloff portion 415 includes a bandwidth having a size of 0.5(β−2 MHz). The bandwidth of the second rolloff portion 415 is centered at $(f_c-0.75\beta-0.5$ MHz) for the second rolloff portion 415-*a* and $(f_c+0.75\beta+0.5$ MHz) for the second rolloff portion 415-*b*. When β is 320 MHz, the bandwidth of the second rolloff portion 415 is 159 MHz and is centered at +240.5 MHz for second rolloff portion 415-*b* and centered at −240.5 MHz for the second rolloff portion 415-*a*, measured from $f_c$. When β is 320 MHz, the bandwidth of the second rolloff portions 415 span between 161 MHz and 320 MHz above and below $f_c$. The second rolloff portion 415 has a power dropoff from −20 dBr to −28 dBr. This defines an associated slope of the second rolloff portion 415.

The third rolloff portion 420 generally defines the third power dropoff portion of the spectral mask 400 from the −28 dBr power level to −40 dBr power level. The third rolloff portion 420 includes a bandwidth having a size of β/2. The bandwidth of the third rolloff portion 420 is centered at $(f_c-1.25\beta)$ for the third rolloff portion 420-*a* and $(f_c+1.25\beta)$ for the third rolloff portion 420-*b*. When β is 320 MHz, the bandwidth of the third rolloff portion 420 is centered at +/−400 MHz from $f_c$. When β is 320 MHz, the bandwidth of the third rolloff portions 420 span between 320 MHz and 480 MHz above and below $f_c$. The third rolloff portion 420 has a power dropoff from −28 dBr to −40 dBr. This defines an associated slope of the third rolloff portion 420.

Thus, a wireless communication device, such as STAs 115 and/or APs 105, may include a transmitter that is configured to generate a wideband contiguous waveform in a band, the waveform having an associated β and $f_c$. The transmitter is configured to transmit the waveform such that the waveform conforms to the spectral mask 400, e.g., conforms to the spectral mask and/or spectral flatness attributes. In some examples, the band is a 5 GHz band and the bandwidth is 320 MHz. It should be noted that the described techniques may be applied to other bands as well (e.g., such as 2.4 GHz, 5 GHz, and sub-6 GHz bands) by analogy, without departing from the scope of the present disclosure. In some cases, 2.4 GHz band may refer to a frequency range (e.g., between 2400-2500 MHz), 5 GHz may refer to some other frequency range (e.g., between 5725-5875 MHz), and sub-6 GHz may refer to yet some other frequency range (e.g., some MHz range below 6 GHz). Each band or frequency range may carry a number of channels (e.g., non-overlapping channels) for communications.

Figure 5:
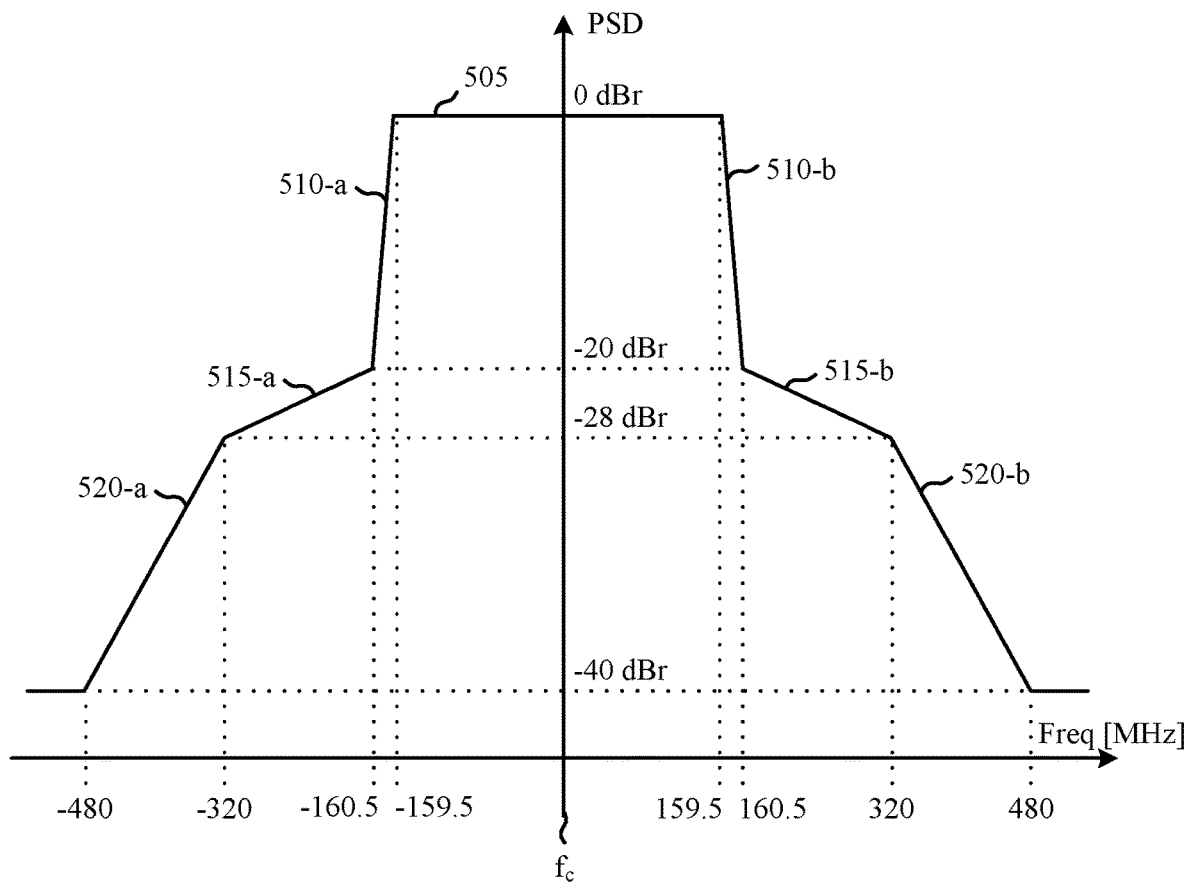

FIG. 5 illustrates an example of a spectral mask 500 that supports spectral mask and flatness for WLAN in accordance with various aspects of the present disclosure. In some examples, spectral mask 500 may be implemented by a wireless communication device, such as a STA 115 and/or an AP 105 described with reference to WLAN 100 and WLAN 200 of FIGS. 1 and 2. The spectral mask 500 may be defined for a contiguous wideband waveform having a bandwidth of β. The spectral mask 500 includes a bandwidth 505 (e.g., a 0 dBr bandwidth), a first rolloff portion 510, a second rolloff portion 515, and a third rolloff portion 520. In some cases, spectral mask 500 may be used for 2× and/or 4× symbol durations. Further, the transmit spectrum may not exceed the maximum of the interim transmit spectrum mask and −59 dBm/MHz at any frequency offset (e.g., FIG. 5 may illustrate an example of the resulting overall spectral mask 500 when the −40 dBr spectrum level is above −59 dBm/MHz).

In some aspects, the spectral mask 500 may be defined for a β value of 320 MHz (e.g., for the transmission of a 320 MHz mask packet layer convergence protocol (PLCP) protocol data unit (PPDU)). The spectral mask 500 may define a 0 dBr bandwidth 505 of 318 MHz (a 159 MHz frequency offset, which includes both +159 MHz and −159 MHz from the center frequency $f_c$), −20 dBr at 160.5 MHz frequency offset, −28 dBr at 320 MHz frequency offset, and −40 dBr at 480 MHz frequency offset and above. The spectral mask 500 for frequency offsets between 159.5 and 160.5 MHz may be linearly interpolated in dB domain from the requirements for 159.5 and 160.5 frequency offsets. The spectral mask 500 for frequency offsets between 160.5 and 320 MHz may be linearly interpolated in dB domain from the requirements for 160.5 and 320 MHz frequency offsets. The spectral mask 500 for frequency offsets between 320 and 480 MHz may be linearly interpolated in dB domain from the requirements for 320 and 480 MHz frequency offsets.

For new values of β (e.g., where $\beta_{new}$ is 160 MHz, 480 MHz, 640 MHz, etc.), frequency values illustrated of spectral mask 400 may be modified (e.g., each frequency value of the horizontal axis may be multiplied by $$\frac{\beta_{new}}{320}).$$

In other examples, certain of the frequency values of the horizontal axis may be multiplied by $$\frac{\beta_{new}}{320},$$

while other frequency values may maintain the offset from β, but newly offset from $\beta_{new}$. For example, the offsets for −40 dBr and −28 dBr may be multiplied by $$\frac{\beta_{new}}{320},$$

while the offsets from the center frequency $f_c$ for −20 dBr may be offset from by a fixed value (e.g., $$\frac{\beta_{new}}{2} + n,$$

where n may be 0.5, 1, or another value, for example less than 2 MHz) and the offsets from the center frequency $f_c$ for 0 dBr may be offset from $$\frac{\beta_{new}}{2}$$

by a fixed value (e.g., $$\frac{\beta_{new}}{2} - m,$$

where m may be 0.5, 1, or another value, for example a value less than 2 MHz). In some cases, the values of m and n may be selected based on the tone spacing or symbol duration (e.g., whether 1×, 2×, or 4×). For example, the values of m and n may be higher for a 1× tone spacing, and lower for a 4× tone spacing. In some cases, a spectral mask (e.g., spectral mask 500) may be used regardless of tone spacing (e.g., β, the values of m and n, etc., may be selected independently from the tone plan or tone spacing).

In some examples, the frequency offsets associated with different rolloff points (e.g., the −20 dBr, −28 dBr, and −40 dBr points) may be adjusted higher or lower to suit a particular application of the principles described herein. Similarly, the defined dBr values at each point can be adjusted higher or lower to suit a particular application of the principles described herein. In some aspects, there may be thresholds for the maximum values of the frequency offsets and defined dBr values for a transmit spectrum.

In some aspects, β defines the bandwidth of the waveform and is measured with respect to the center frequency, $f_c$. The β may be 320 MHz, and the 320 MHz is generally defined as +/−160 MHz (e.g., 160 MHz above $f_c$ and 160 MHz below $f_c$). The β may be associated with a tone index. The tone index may be a function of the β (and/or of the bandwidth 505) divided by the number of tones (or sub-carriers) that are available and/or selected for use in the β or bandwidth 505.

The bandwidth 505 conforms to spectral flatness attributes. For example, the bandwidth 505 may be divided into multiple regions, such as inner, intermediate, and outer regions, where each region includes associated tones (e.g., associated tones of a region comprising a set of subcarriers). Each tone within a region may be transmitted at a power level conforming to a maximum deviation for the region. The spectral flatness attribute of the bandwidth 505 may provide for an average transmit power for tones across the bandwidth 505. As is understood, the actual transmit power of the average transmit power for tones across the bandwidth 505 varies depending upon various conditions, such as channel conditions, propagation distance, etc. For reference purposes, the average transmit power for tones across the bandwidth 505 is generally referred to as a 0 dBr transmit power.

The spectral mask 500 may include first rolloff portion 510, second rolloff portion 515, and third rolloff portion 520, that define the 'skirt' of the spectral mask. The spectral mask 500 includes a skirt on the leading edge (e.g., frequencies below and approaching $f_c$) as well as a skirt on the trailing edge (e.g., frequencies above and departing from $f_c$). For ease of reference, the rolloff portions for the leading edge are denoted as 510-*a*, 515-*a*, and 520-*a*, and the rolloff portions for the trailing edge are denoted as 510-*b*, 515-*b*, and 520-*b*. It is to be understood that the spectral mask 500 is symmetrical and therefore the leading and trailing edge skirts have similar attributes.

The first rolloff portion 510 generally defines the first power dropoff portion of the spectral mask 500 from the 0 dBr power level. The first rolloff portion 510 includes a 1 MHz bandwidth that is centered at the outer edges of the β, e.g., at ($f_c$+0.5β) and at ($f_c$−0.5β). When β is 320 MHz, the bandwidth of the first rolloff portion 510 is centered at +/−160 MHz from $f_c$ and the 1 MHz bandwidth spans between 159.5 MHz and 160.5 MHz above and below $f_c$. The first rolloff portion has a power dropoff from 0 dBr to −20 dBr. This defines an associated slope of the first rolloff portion 510.

The second rolloff portion 515 generally defines the second power dropoff portion of the spectral mask 500 from the −20 dBr power level to the −28 dBr power level. The second rolloff portion 515 includes a bandwidth having a size of 0.5(β−1 MHz). The bandwidth of the second rolloff portion 515 is centered at ($f_c$−0.75β−0.25 MHz) for the second rolloff portion 515-*a* and ($f_c$+0.75β+0.25 MHz) for the second rolloff portion 515-*b*. When β is 320 MHz, the bandwidth of the second rolloff portion 515 is 159.5 MHz and is centered at +240.25 MHz for second rolloff portion 515-*b* and centered at −240.25 MHz for the second rolloff portion 515-*a*, measured from $f_c$. When β is 320 MHz, the bandwidth of the second rolloff portions 515 span between 160.5 MHz and 320 MHz above and below $f_c$. The second rolloff portion 515 has a power dropoff from −20 dBr to −28 dBr. This defines an associated slope of the second rolloff portion 515.

The third rolloff portion 520 generally defines the third power dropoff portion of the spectral mask 500 from the −28 dBr power level to the −40 dBr power level. The third rolloff portion 520 includes a bandwidth having a size of β/2. The bandwidth of the third rolloff portion 520 is centered at ($f_c$−1.25β) for the third rolloff portion 520-*a* and ($f_c$+1.25β) for the third rolloff portion 520-*b*. When β is 320 MHz, the bandwidth of the third rolloff portion 520 is centered at +/−400 MHz from $f_c$. When β is 320 MHz, the bandwidth of the third rolloff portions 520 span between 320 MHz and 480 MHz above and below $f_c$. The third rolloff portion 520 has a power dropoff from −28 dBr to −40 dBr. This defines an associated slope of the third rolloff portion 520.

Thus, a wireless communication device, such as STAs 115 and/or APs 105, may include a transmitter that is configured to generate a wideband contiguous waveform in a band, the waveform having an associated β and $f_c$. The transmitter is configured to transmit the waveform such that the waveform conforms to the spectral mask 500, e.g., conforms to the spectral mask and/or spectral flatness attributes. In some examples, the band is a 5 GHz band and the bandwidth is 320 MHz. It should be noted that the described techniques may be applied to other bands as well (e.g., such as 2.4 GHz, 5 GHz, and sub-6 GHz bands) by analogy, without departing from the scope of the present disclosure.

Further, for each bandwidth, the frequency offsets at −28 dBr and −40 dBr may be fixed. However, the frequency offsets from the transition period (e.g., 0 dBr and −20 dBr) may be adjusted by a small value if the bandwidth resolution in measurement is changed. That is, with reference to both FIGS. 4 and 5, the frequency offsets at −28 dBr (e.g., ±320 MHz) and −40 dBr (e.g., ±480 MHz) may be fixed (e.g., regardless of the symbol duration). However, frequency offsets at the transition period at 0 dBr and −20 dBr may depend on bandwidth resolution or symbol duration (e.g., 0 dBr at ±159 MHz and −20 dBr±161 MHz for 1×/2× and 0 dBr at ±159.5 MHz and −20 dBr±160.5 for 2×/4×).

Figure 6:
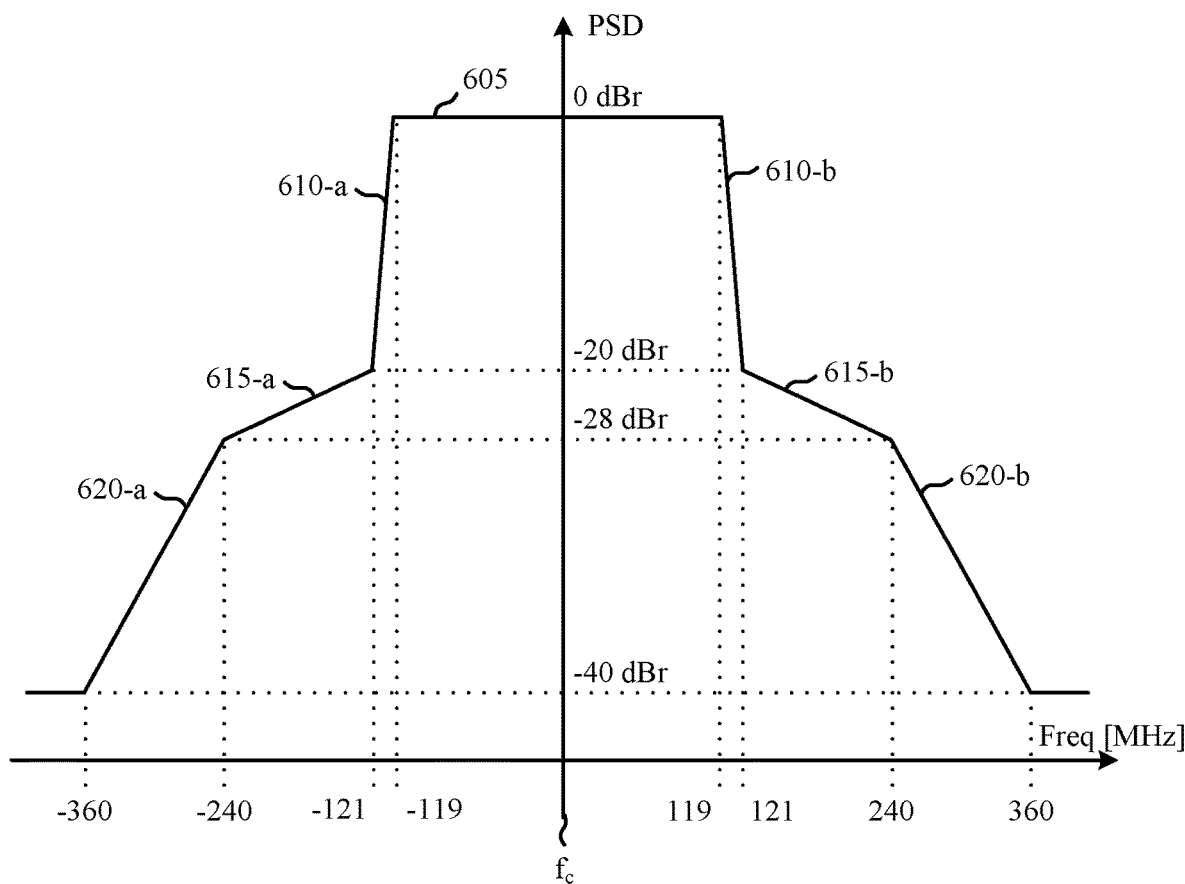

FIG. 6 illustrates an example of a spectral mask 600 that supports spectral mask and flatness for WLAN in accordance with various aspects of the present disclosure. In some examples, spectral mask 600 may be implemented by a wireless communication device, such as a STA 115 and/or an AP 105 described with reference to WLAN 100 and WLAN 200 of FIGS. 1 and 2. The spectral mask 600 may be defined for a contiguous wideband waveform having a bandwidth of β. The spectral mask 600 includes a 0 dBr bandwidth 605, a first rolloff portion 610, a second rolloff portion 615, and a third rolloff portion 620. In some cases, spectral mask 600 may be used for 1× and/or 2× symbol durations, as discussed herein. Further, a transmission requirement may be that the transmit spectrum may not exceed the maximum of the interim transmit spectrum mask and −59 dBm/MHz at any frequency offset (e.g., FIG. 6 may illustrate an example of the resulting overall spectral mask 600 when the −40 dBr spectrum level is above −59 dBm/MHz).

In some aspects, the spectral mask 600 may be defined for a β value of 240 MHz (e.g., for the transmission of a 240 MHz mask PPDU). The spectral mask 600 may define a 0 dBr bandwidth of 238 MHz (a 119 MHz frequency offset, which includes both +119 MHz and −119 MHz from the center frequency $f_c$), −20 dBr at 121 MHz frequency offset, −28 dBr at 240 MHz frequency offset, and −40 dBr at 360 MHz frequency offset and above. The spectral mask 600 for frequency offsets in between 119 and 121 MHz may be linearly interpolated in dB domain from the requirements for 119 and 121 MHz frequency offsets. The spectral mask 600 for frequency offsets in between 121 and 240 MHz may be linearly interpolated in dB domain from the requirements for 121 and 240 MHz frequency offsets. The spectral mask 600 for frequency offsets in between 240 and 360 MHz may be linearly interpolated in dB domain from the requirements for 240 and 360 MHz frequency offsets.

For new values of β (e.g., where $β_{new}$ is 160 MHz, 360 MHz, 640 MHz, etc.), frequency values illustrated of spectral mask 600 may be modified (e.g., each frequency value of the horizontal axis may be multiplied by $$\frac{β_{new}}{240}).$$

In other examples, certain of the frequency values of the horizontal axis may be multiplied by $$\frac{β_{new}}{240},$$

while other frequency values may maintain the offset from β, but newly offset from $β_{new}$. For example, the offsets for −40 dBr and −28 dBr may be multiplied by $$\frac{β_{new}}{240},$$

while the offsets from the center frequency $f_c$ for −20 dBr may be offset from $$\frac{β_{new}}{2}$$

by a fixed value (e.g, $$\frac{β_{new}}{2}+n,$$

where n may be 0.5, 1, or another value, for example less than 2 MHz) and the offsets from the center frequency $f_c$ for 0 dBr may be offset from $$\frac{β_{new}}{2}$$

by a fixed value (e.g, $$\frac{β_{new}}{2}-m,$$

where m may be 0.5, 1, or another value, for example a value less than 2 MHz). The values of m and n may be selected based on the tone spacing or symbol duration (e.g., whether 1×, 2×, or 4×). The values of m and n may be higher for a 1× tone spacing, and lower for a 4× tone spacing. In some cases, a spectral mask (e.g., spectral mask 600) may be used regardless of tone spacing (e.g., β, the values of m and n, etc., may be selected independently from the tone plan or tone spacing).

In some examples, the frequency offsets associated with different rolloff points (e.g., the −20 dBr, −28 dBr, and −40 dBr points) may be adjusted higher or lower to suit a particular application of the principles described herein. Similarly, the defined dBr values at each point can be adjusted higher or lower to suit a particular application of the principles described herein. In some aspects, there may be thresholds for the maximum values of the frequency offsets and defined dBr values for a transmit spectrum. In one example, for a 20 MHz mask PPDU of HE format, the transmit spectrum may not exceed the maximum of the interim transmit spectral mask and −53 dBm/MHz at any frequency offset. In another example, for a 40 MHz mask PPDU of HE format, the transmit spectrum may not exceed the maximum of the interim transmit spectral mask and −56 dBm/MHz at any frequency offset. For an 80 MHz, 160 MHz, or 80+80 MHz mask PPDU of HE format, the transmit spectrum may not exceed the maximum of the interim transmit spectral mask and −59 dBm/MHz at any frequency offset.

In some aspects, β defines the bandwidth of the waveform and is measured with respect to the center frequency, $f_c$. The β may be 240 MHz, and the 240 MHz is generally defined as +/−120 MHz (e.g., 120 MHz above $f_c$ and 120 MHz below $f_c$). The β may be associated with a tone index. The tone index is may be function of the β (and/or of the bandwidth 605) divided by the number of tones (or subcarriers) that are available and/or selected for use in the β or bandwidth 605.

The bandwidth 605 conforms to spectral flatness attributes. For example, the bandwidth 605 may be divided into multiple regions, such as inner, intermediate, and outer regions, where each region includes associated tones (e.g., associated tones of a region comprising a set of subcarriers). Each tone within a region may be transmitted at a power level conforming to a maximum deviation for the region. The spectral flatness attribute of the bandwidth 605 may provide for an average transmit power for tones across the bandwidth 605. As is understood, the actual transmit power of the average transmit power for tones across the bandwidth 605 varies depending upon various conditions, such as channel conditions, propagation distance, etc. For reference purposes, the average transmit power for tones across the bandwidth 605 is generally referred to as a 0 dBr transmit power.

Generally, the spectral flatness attributes can be a function of the LO leakage of the transmitter. For example, the transmit LO leakage can conform to the described spectral flatness attributes for all β and, in some aspects, for all PPDU formats (e.g., HT, VHT, HE, EHT, etc.).

In some aspects, wireless devices may communicate using OFDMA techniques and the 20 MHz, 40 MHz, 80 MHz, 160 MHz, or 80+80 MHz bandwidth may be divided into multiple RUs. As an example, some wireless devices may communicate using a first set of RUs and other wireless devices may communicate using a second set of RUs. As such, spectral flatness may be tested on used RUs and the averaging subcarrier indices and tested subcarrier indices may be equal to the tone indices in the used RU being tested. In some examples, the maximum allowed deviation of the transmit power associated with a set of tones (or subcarriers) in the RU being tested may be +4/−6 dB.

The spectral mask 600 also includes first rolloff portion 610, second rolloff portion 615, and third rolloff portion 620, that define the 'skirt' of the spectral mask. The spectral mask 600 includes a skirt on the leading edge (e.g., frequencies below and approaching $f_c$) as well as a skirt on the trailing edge (e.g., frequencies above and departing from $f_c$). For ease of reference, the rolloff portions for the leading edge are denoted as 610-a, 615-a, and 620-a, and the rolloff portions for the trailing edge are denoted as 610-b, 615-b, and 620-b. It is to be understood that the spectral mask 600 is symmetrical and therefore the leading and trailing edge skirts have similar attributes.

The first rolloff portion 610 generally defines the first power dropoff portion of the spectral mask 600 from the 0 dBr power level. The first rolloff portion 610 includes a 2 MHz bandwidth that is centered at the outer edges of the β, e.g., at ($f_c$+0.5β) and at ($f_c$−0.5β). When β is 240 MHz, the bandwidth of the first rolloff portion 610 is centered at +/−120 MHz from $f_c$ and the 2 MHz bandwidth spans between 119 MHz and 121 MHz above and below $f_c$. The first rolloff portion has a power dropoff from 0 dBr to −20 dBr. This defines an associated slope of the first rolloff portion 610.

The second rolloff portion 615 generally defines the second power dropoff portion of the spectral mask 600 from the −20 dBr power level to the −28 dBr power level. The second rolloff portion 615 includes a bandwidth having a size of 0.5(β−2 MHz). The bandwidth of the second rolloff portion 615 is centered at ($f_c$−0.75β−0.5 MHz) for the second rolloff portion 615-a and ($f_c$+0.75β+0.5 MHz) for the second rolloff portion 615-b. When β is 240 MHz, the bandwidth of the second rolloff portion 615 is 119 MHz and is centered at +240.5 MHz for second rolloff portion 615-b and centered at −240.5 MHz for the second rolloff portion 615-a, measured from $f_c$. When is 240 MHz, the bandwidth of the second rolloff portions 615 span between 121 MHz and 240 MHz above and below $f_c$. The second rolloff portion 615 has a power dropoff from −20 dBr to −28 dBr. This defines an associated slope of the second rolloff portion 615.

The third rolloff portion 620 generally defines the third power dropoff portion of the spectral mask 600 from the −28 dBr power level to −40 dBr power level. The third rolloff portion 620 includes a bandwidth having a size of β/2. The bandwidth of the third rolloff portion 620 is centered at ($f_c$−1.25β) for the third rolloff portion 620-a and ($f_c$+1.25β) for the third rolloff portion 620-b. When β is 240 MHz, the bandwidth of the third rolloff portion 620 is centered at +/−300 MHz from $f_c$. When β is 240 MHz, the bandwidth of the third rolloff portions 620 span between 240 MHz and 360 MHz above and below $f_c$. The third rolloff portion 620 has a power dropoff from −28 dBr to −40 dBr. This defines an associated slope of the third rolloff portion 620.

Thus, a wireless communication device, such as STAs 115 and/or APs 105, may include a transmitter that is configured to generate a wideband contiguous waveform in a band, the waveform having an associated β and $f_c$. The transmitter is configured to transmit the waveform such that the waveform conforms to the spectral mask 600, e.g., conforms to the spectral mask and/or spectral flatness attributes. In some examples, the band is a 5 GHz band and the bandwidth is 240 MHz. It should be noted that the described techniques may be applied to other bands as well (e.g., such as 2.4 GHz, 5 GHz, and sub-6 GHz bands) by analogy, without departing from the scope of the present disclosure.

Figure 7:
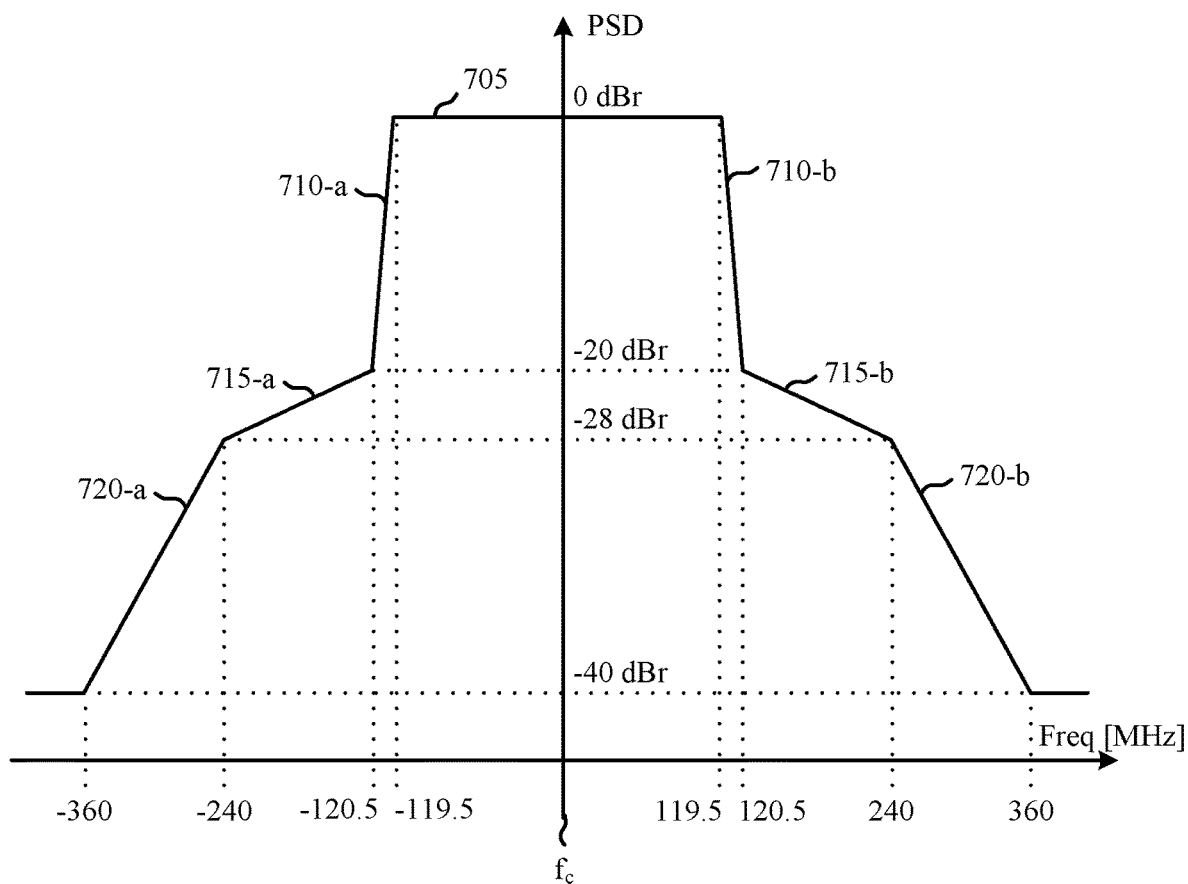

FIG. 7 illustrates an example of a spectral mask 700 that supports spectral mask and flatness for WLAN in accordance with various aspects of the present disclosure. In some examples, spectral mask 700 may be implemented by a wireless communication device, such as a STA 115 and/or an AP 105 described with reference to WLAN 100 and WLAN 200 of FIGS. 1 and 2. The spectral mask 700 may be defined for a contiguous wideband waveform having a bandwidth of β. The spectral mask 700 includes a bandwidth 705 (e.g., a 0 dBr bandwidth), a first rolloff portion 710, a second rolloff portion 715, and a third rolloff portion 720. In some cases, spectral mask 700 may be used for 2× and/or 4× symbol durations. Further, the transmit spectrum may not exceed the maximum of the interim transmit spectrum mask and −59 dBm/MHz at any frequency offset (e.g., FIG. 7 may illustrate an example of the resulting overall spectral mask 700 when the −40 dBr spectrum level is above −59 dBm/MHz).

In some aspects, the spectral mask 700 may be defined for a β value of 240 MHz (e.g., for the transmission of a 240 MHz mask packet layer convergence protocol (PLCP) protocol data unit (PPDU)). The spectral mask 700 may define a 0 dBr bandwidth 705 of 318 MHz (a 119 MHz frequency offset, which includes both +119 MHz and −119 MHz from the center frequency $f_c$), −20 dBr at 120.5 MHz frequency offset, −28 dBr at 240 MHz frequency offset, and −40 dBr at 360 MHz frequency offset and above. The spectral mask 700 for frequency offsets between 119.5 and 120.5 MHz may be linearly interpolated in dB domain from the requirements for 119.5 and 120.5 frequency offsets. The spectral mask 700 for frequency offsets between 120.5 and 240 MHz may be linearly interpolated in dB domain from the requirements for 120.5 and 240 MHz frequency offsets. The spectral mask 700 for frequency offsets between 240 and 360 MHz may be linearly interpolated in dB domain from the requirements for 240 and 360 MHz frequency offsets.

For new values of β (e.g., where $β_{new}$ is 160 MHz, 480 MHz, 640 MHz, etc.), frequency values illustrated of spectral mask 600 may be modified (e.g., each frequency value of the horizontal axis may be multiplied by $$\frac{β_{new}}{240}).$$

In other examples, certain of the frequency values of the horizontal axis may be multiplied by $$\frac{β_{new}}{240},$$

while other frequency values may maintain the offset from β, but newly offset from $β_{new}$. For example, the offsets for −40 dBr and −28 dBr may be multiplied by $$\frac{β_{new}}{240},$$

while the offsets from the center frequency $f_c$ for −20 dBr may be offset from $$\frac{β_{new}}{2}$$

by a fixed value (e.g, $$\frac{β_{new}}{2} + n,$$

where n may be 0.5, 1, or another value, for example less than 2 MHz) and the offsets from the center frequency $f_c$ for 0 dBr may be offset from $$\frac{β_{new}}{2}$$

by a fixed value (e.g, $$\frac{β_{new}}{2} - m,$$

where m may be 0.5, 1, or another value, for example a value less than 2 MHz). In some cases, the values of m and n may be selected based on the tone spacing or symbol duration (e.g., whether 1×, 2×, or 4×). For example, the values of m and n may be higher for a 1× tone spacing, and lower for a 4× tone spacing. In some cases, a spectral mask (e.g., spectral mask 700) may be used regardless of tone spacing (e.g., β, the values of m and n, etc., may be selected independently from the tone plan or tone spacing).

In some examples, the frequency offsets associated with different rolloff points (e.g., the −20 dBr, −28 dBr, and −40 dBr points) may be adjusted higher or lower to suit a particular application of the principles described herein. Similarly, the defined dBr values at each point can be adjusted higher or lower to suit a particular application of the principles described herein. In some aspects, there may be thresholds for the maximum values of the frequency offsets and defined dBr values for a transmit spectrum.

In some aspects, β defines the bandwidth of the waveform and is measured with respect to the center frequency, $f_c$. The β may be 240 MHz, and the 240 MHz is generally defined as +/−120 MHz (e.g., 120 MHz above $f_c$ and 120 MHz below $f_c$). The β may be associated with a tone index. The tone index may be a function of the β (and/or of the bandwidth 705) divided by the number of tones (or subcarriers) that are available and/or selected for use in the β or bandwidth 705.

The bandwidth 705 conforms to spectral flatness attributes. For example, the bandwidth 705 may be divided into multiple regions, such as inner, intermediate, and outer regions, where each region includes associated tones (e.g., associated tones of a region comprising a set of subcarriers). Each tone within a region may be transmitted at a power level conforming to a maximum deviation for the region. The spectral flatness attribute of the bandwidth 705 may provide for an average transmit power for tones across the bandwidth 705. As is understood, the actual transmit power of the average transmit power for tones across the bandwidth 705 varies depending upon various conditions, such as channel conditions, propagation distance, etc. For reference purposes, the average transmit power for tones across the bandwidth 705 is generally referred to as a 0 dBr transmit power.

The spectral mask 700 may include first rolloff portion 710, second rolloff portion 715, and third rolloff portion 720, that define the 'skirt' of the spectral mask. The spectral mask 700 includes a skirt on the leading edge (e.g., frequencies below and approaching $f_c$) as well as a skirt on the trailing edge (e.g., frequencies above and departing from $f_c$). For ease of reference, the rolloff portions for the leading edge are denoted as 710-a, 715-a, and 720-a, and the rolloff portions for the trailing edge are denoted as 710-b, 715-b, and 720-b. It is to be understood that the spectral mask 700 is symmetrical and therefore the leading and trailing edge skirts have similar attributes.

The first rolloff portion 710 generally defines the first power dropoff portion of the spectral mask 700 from the 0 dBr power level. The first rolloff portion 710 includes a 1 MHz bandwidth that is centered at the outer edges of the β, e.g., at ($f_c$ +0.5β) and at ($f_c$−0.5β). When β is 240 MHz, the bandwidth of the first rolloff portion 710 is centered at +/−120 MHz from $f_c$ and the 1 MHz bandwidth spans between 119.5 MHz and 120.5 MHz above and below $f_c$. The first rolloff portion has a power dropoff from 0 dBr to −20 dBr. This defines an associated slope of the first rolloff portion 710.

The second rolloff portion 715 generally defines the second power dropoff portion of the spectral mask 700 from the −20 dBr power level to the −28 dBr power level. The second rolloff portion 715 includes a bandwidth having a size of 0.5(β−1 MHz). The bandwidth of the second rolloff portion 715 is centered at ($f_c$−0.75β−0.25 MHz) for the second rolloff portion 715-a and ($f_c$+0.75β+0.25 MHz) for the second rolloff portion 715-*b*. When β is 240 MHz, the bandwidth of the second rolloff portion 715 is 119.5 MHz and is centered at +240.25 MHz for second rolloff portion 715-*b* and centered at −240.25 MHz for the second rolloff portion 715-*a*, measured from $f_c$. When β is 240 MHz, the bandwidth of the second rolloff portions 715 span between 120.5 MHz and 240 MHz above and below $f_c$. The second rolloff portion 715 has a power dropoff from −20 dBr to −28 dBr. This defines an associated slope of the second rolloff portion 715.

The third rolloff portion 720 generally defines the third power dropoff portion of the spectral mask 700 from the −28 dBr power level to the −40 dBr power level. The third rolloff portion 720 includes a bandwidth having a size of β/2. The bandwidth of the third rolloff portion 720 is centered at $(f_c−1.25β)$ for the third rolloff portion 720-*a* and $(f_c+1.25β)$ for the third rolloff portion 720-*b*. When β is 240 MHz, the bandwidth of the third rolloff portion 720 is centered at +/−300 MHz from $f_c$. When β is 240 MHz, the bandwidth of the third rolloff portions 720 span between 240 MHz and 360 MHz above and below $f_c$. The third rolloff portion 720 has a power dropoff from −28 dBr to −40 dBr. This defines an associated slope of the third rolloff portion 720.

Thus, a wireless communication device, such as STAs 115 and/or APs 105, may include a transmitter that is configured to generate a wideband contiguous waveform in a band, the waveform having an associated β and $f_c$. The transmitter is configured to transmit the waveform such that the waveform conforms to the spectral mask 700, e.g., conforms to the spectral mask and/or spectral flatness attributes. In some examples, the band is a 5 GHz band and the bandwidth is 240 MHz. It should be noted that the described techniques may be applied to other bands as well (e.g., such as 2.4 GHz, 5 GHz, and sub-6 GHz bands) by analogy, without departing from the scope of the present disclosure.

Further, for each bandwidth, the frequency offsets at −28 dBr and −40 dBr may be fixed. However, the frequency offsets from the transition period (e.g., 0 dBr and −20 dBr) may be adjusted by a small value if the bandwidth resolution in measurement is changed. That is, with reference to both FIGS. 6 and 7, the frequency offsets at −28 dBr (e.g., ±240 MHz) and −40 dBr (e.g., ±360 MHz) may be fixed (e.g., regardless of the symbol duration). However, frequency offsets at the transition period at 0 dBr and −20 dBr may depend on bandwidth resolution or symbol duration (e.g., 0 dBr at ±119 MHz and −20 dBr±121 MHz for 1×/2× and 0 dBr at ±119.5 MHz and −20 dBr±120.5 for 2×/4×).

Figure 8:
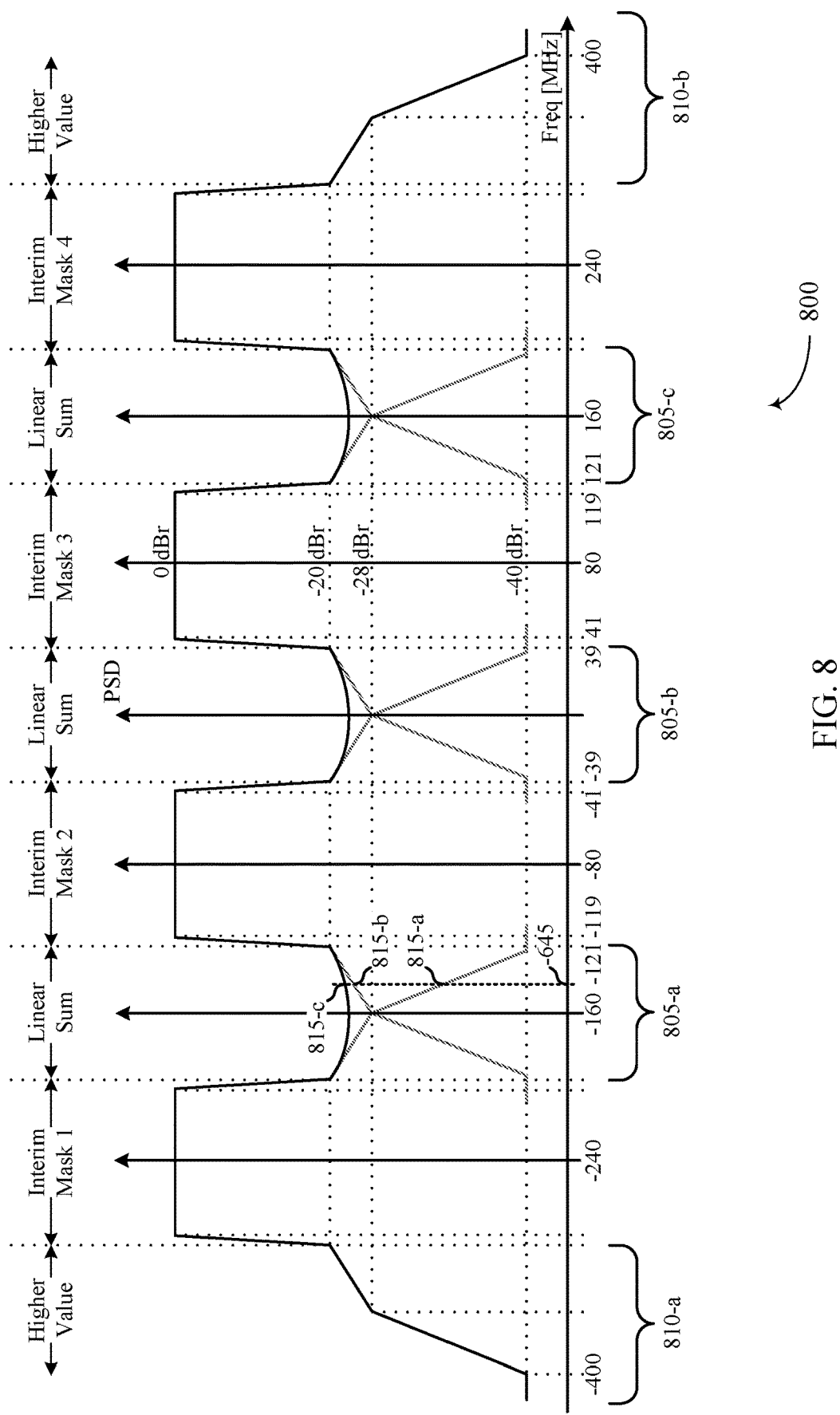

FIG. 8 illustrates an example of a spectral mask 800 that supports spectral mask and flatness for WLAN in accordance with various aspects of the present disclosure. In some examples, spectral mask 800 may implement aspects of WLAN 100 and WLAN 200 as described with reference to FIGS. 1 and 2. Spectral mask 800 may represent a spectral mask for a 4×80 MHz transmission mode. For example, spectral mask 800 may include four spectral masks each defined by a β value of 80 MHz, superimposed, to result in a spectral mask 800 (e.g., for Mode 4 as described with reference to FIG. 3). The overall spectral mask 800 may thus be constructed as illustrated in FIG. 8. 80 MHz interim spectral masks may be placed on each 80 MHz segment. For example, Interim Mask 1 may be centered at −240 MHz, Interim Mask 2 may be centered at −80 MHz, Interim Mask 3 may be centered at 80 MHz, and Interim Mask 4 may be centered at 240 MHz. In some cases, overlapping regions of individual spectral masks (e.g., spectral masks for each β value of 80 MHz) may contribute to the overall spectral mask 800 as a liner sum (e.g., in region 805-*a*, region 805-*b* and region 805-*c*). In some cases, such as for outer regions (e.g., region 810-*a* and region 810-*b*), the higher value of overlapping contributing spectral masks may be used for the overall spectral mask 800.

That is, for each frequency at which there are (at least) two interim spectral masks having values greater than −40 dBr and less than −20 dBr, the sum of the two interim mask values (summed in the linear domain) may be taken as the value for the overall spectral mask 800. In outer regions (e.g., region 810-*a* and region 810-*b*), there may be no contribution from neighboring spectral masks, as neighboring spectral masks may not have values greater than −40 dBr in these regions. That is, in region 810-*a*, the neighboring spectral mask associated with Interim Mask 2 does not have a value greater than −40 dBr, therefore the value of the spectral mask associated with Interim Mask 1 is the higher value, and is thus taken as the value for overall spectral mask 800. However, in region 805-*a*, region 805-*b* and region 805-*c*, neighboring spectral masks may both have values greater than −40 dBr and less than −20 dBr. As such the sum of neighboring spectral masks in region 805-*a*, region 805-*b* and region 805-*c* may be summed in the linear domain. For example, in region 805-*a*, two neighboring spectral masks (e.g., associated with Interim Mask 1 and Interim Mask 2) may both have values greater than −40 dBr and less than −20 dBr. As such, the two neighboring spectral masks may be added together (e.g., summed in the linear domain) in region 805-*a*, resulting in the overall spectral mask 800 in region 805-*a*. That is, at −645 MHz, the spectral mask associated with Interim Mask 1 may have some dBr value 815-*a*, and the spectral mask associated with Interim Mask 2 may have some dBr value 815-*b*. Therefore, the value for the spectral mask 800, at −645 MHz, may be dBr value 815-*c*, where dBr value 815-*c* is equal to the sum of dBr value 815-*a* and dBr value 815-*b*.

In some cases, for each frequency at which neither of any interim masks have values greater than or equal to −20 dBr and less than or equal to 0 dBr, the higher value of the interim masks may be taken as the overall interim spectral value (e.g., the value for the overall spectral mask 800). Further, for any frequency region where the mask value has not been defined yet, linear interpolation (e.g., in the dB domain) between the nearest two frequency points with the interim spectral mask value defined may be used to define the interim spectral mask value. Finally, the transmit spectrum may not exceed the maximum of the interim transmit spectrum mask and −59 dBm/MHz and any frequency offset.

It should be noted that the example of FIG. 8 shows an example of a spectral mask for a 4×80 MHz transmission mode, however the techniques described may be applied to other transmission modes described herein. That is, such techniques (e.g., linear interpolation in dB domain for certain frequency offset ranges, adjustments in transmission, etc.) may be applied to 160+80×2 MHz, 3×80 MHz, 160+80 MHz with uneven subband size, 160+80×2 MHz uneven subband size, etc., including the transmission modes described with reference to FIG. 3, by analogy without departing from the scope of the present disclosure.

Figure 9:
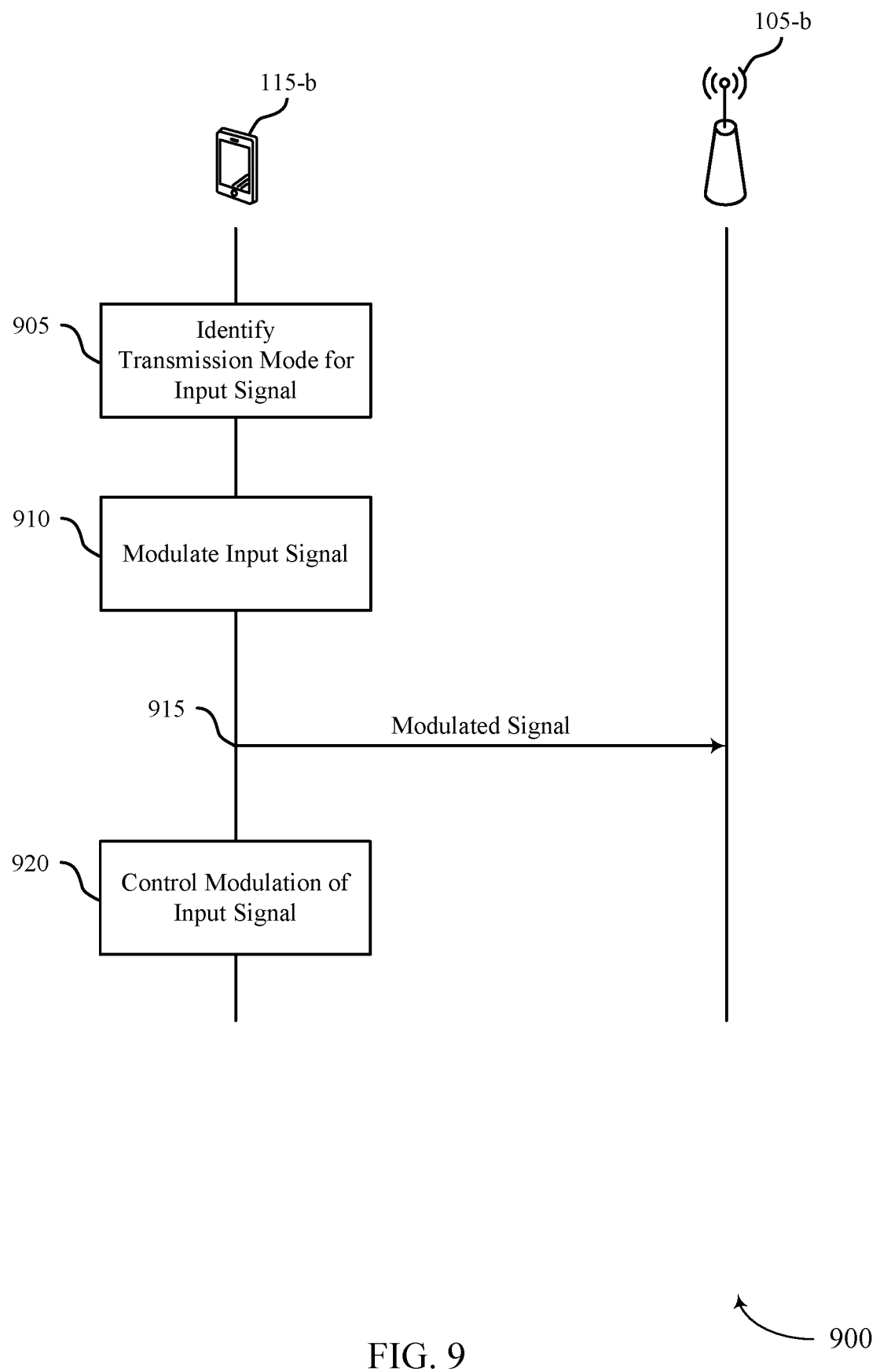
FIG. 9 illustrates an example of a process flow that supports spectral mask and flatness for WLAN in accordance with aspects of the present disclosure.

FIG. 9 illustrates an example of a process flow 900 that supports spectral mask and flatness for WLAN in accordance with various aspects of the present disclosure. In some examples, process flow 900 may implement aspects of WLAN 100 and WLAN 200 as described with reference to FIGS. 1 and 2. Further, although shown as a method or process occurring at a STA 115 for transmissions to an AP 105, the process flow 900 may apply to any communications between wireless devices.

At 905, a STA 115-*b* may identify a transmission mode for an input signal. In some cases, the transmission mode may have three or more non-contiguous RF spectrum bands (e.g., three non-contiguous RF bands may include RF spectrums bands of: (i) 160 MHz, 80 MHz, and 80 MHz; or (ii) 80 MHz, 80 MHz, 80 MHz, and 80 MHz; etc.). In some cases, the total bandwidth of the identified transmission mode (e.g., the three or more non-contiguous RF spectrum bands) may be greater than 160 MHz. In some cases, the total bandwidth of the identified transmission mode (e.g., the three or more non-contiguous RF spectrum bands) may be greater than 320 MHz.

At 910, a STA 115-*b* may modulate the input signal to generate a modulated signal according to the transmission mode identified at 905. For example, the input signal may be modulated according to Mode 3 or Mode 4, with reference to FIG. 3, depending on channel availability.

At 915, STA 115-*b* may transmit the modulated signal at a power level to produce a transmitted signal having a spectral envelope.

At 920, STA 115-*b* may control the modulation of the input signal to be transmitted to maintain the spectral envelope to be within a spectral mask that is defined for the transmission mode. For example, the modulation of the input signal may be controlled to maintain the spectral envelope to be within some spectral mask parameters (e.g., which may depend on the transmission mode, the symbol duration, etc.) as discussed in detail above. In some cases, the spectral mask may include a 0 dBr bandwidth for each of the non-contiguous RF spectrum bands of the transmission mode. The 0 dBr bandwidths may be non-contiguous, and unused subband regions may exist between the 0 dBr bandwidth regions. At least a portion of the unused subband region may represent a linear sum of a first interim spectral mask for a first non-contiguous RF spectrum band and a second interim spectral mask for a second non-contiguous RF spectrum band. That is, portions of unused subband regions may represent linear sums of neighboring interim spectral masks associated with neighboring non-contiguous RF spectrum bands of the transmission mode. For example, linear sums of neighboring interim spectral masks in unused subband regions may span frequency ranges where the overlapping interim spectral masks (e.g., neighboring interim spectral masks) span each value for the frequency range greater than −40 dBr and less than −20 dBr.

Transmission modes may use a symbol duration or tone spacing of, for example, 4×, (e.g., 78.125 kHz), or 2× (e.g., 156.25 kHz), or 4× (e.g., 312.5 kHz). In some cases (e.g., depending on the symbol duration), a transition between 0 dBr bandwidths and −20 dBr bandwidths of the interim spectral masks may be 1 MHz, 2 MHz, etc. For each interim spectral mask, the bandwidth of 0 dBr bandwidth regions may thus be represented as $\beta$−1 MHz, $\beta$−2 MHz, etc. depending on the transition dBr bandwidth, where $\beta$ is the bandwidth of the non-contiguous RF spectrum band. The boundaries or frequency offsets of such transitions may depend on a carrier frequency and $\beta$ associated with each interim spectral mask. Bandwidths and boundaries of other transitions associated with each interim spectral mask (e.g., transitions from −20 dBr to −28 dBr, from −28 dBr to −40 dBr, etc.) may be determined based on analogous or generalized techniques described above with reference to FIGS. 4 and 5.

Further, the modulation of the input signal may be controlled to be within a spectral flatness deviation range. In some cases, the spectral flatness deviation range may include +4 dB/−4 dB, and/or +4 dB/−6 dB for the plurality of subcarriers. For example, the spectral flatness deviation range may be +4 dB/−4 dB for five or more sets of adjacent subcarriers, and +4 dB/−6 dB for five or more other sets of adjacent subcarriers. A controller may control (e.g., modify or adjust) the amplification and/or modulation for one or subcarriers, or one or more sets of subcarriers, to meet the spectral flatness deviation ranges (and/or spectral mask) specified for the subcarriers.

Modulating the input signal may further include filtering the input signal (e.g., using a filter (e.g. a low pass filter) to generate a filtered input signal. In such cases, at 910, STA 115-*b* may modulate the filtered input signal to generate the modulated signal. Additionally, controlling the modulation of the input signal may then include controlling the filter to maintain the spectral envelope to be within the spectral mask and/or meet the spectral flatness requirements that are defined for the transmission mode.

Figure 10:
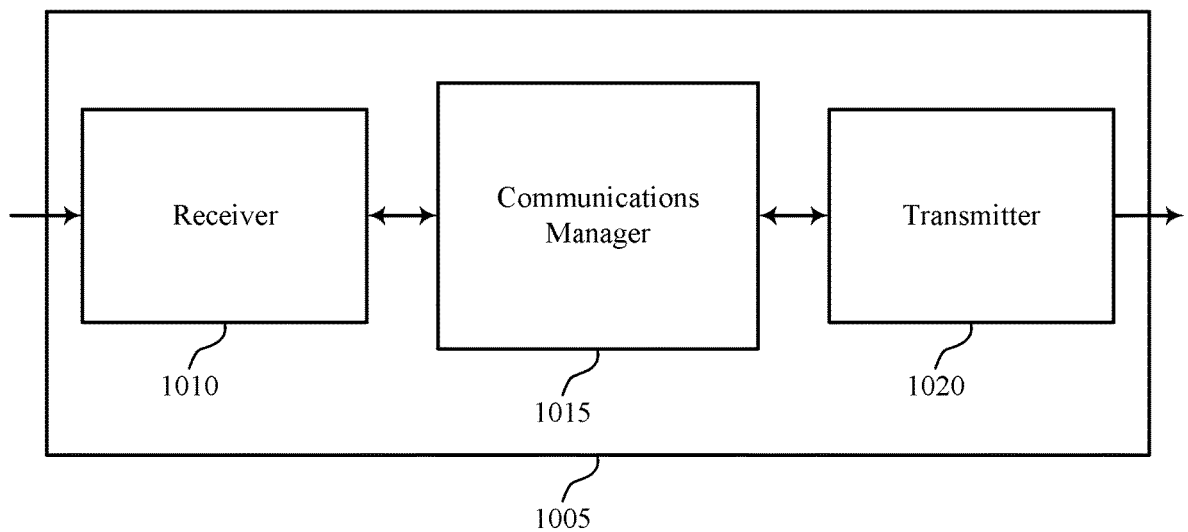
FIGS. 10 through 12 show block diagrams of a device that supports spectral mask and flatness for WLAN in accordance with aspects of the present disclosure.

FIG. 10 shows a block diagram 1000 of a wireless device 1005 that supports spectral mask and flatness for WLAN in accordance with aspects of the present disclosure. Wireless device 1005 may be an example of aspects of a STA 115 and/or AP 105 as described herein. Wireless device 1005 may include receiver 1010, communications manager 1015, and transmitter 1020. Wireless device 1005 may also include a processor (not shown). Each of these components may be in communication with one another (e.g., via one or more buses).

Receiver 1010 may receive information such as packets, user data, or control information associated with various information channels (e.g., control channels, data channels, and information related to spectral mask and flatness for WLAN, etc.). Information may be passed on to other components of the device. The receiver 1010 may be an example of aspects of the transceiver 1335 described with reference to FIG. 13. The receiver 1010 may utilize a single antenna or a set of antennas.

Communications manager 1015 may be an example of aspects of the communications manager 1315 described with reference to FIG. 13. Communications manager 1015 and/or at least some of its various sub-components may be implemented in hardware, software executed by a processor, firmware, or any combination thereof. If implemented in software executed by a processor, the functions of the communications manager 1015 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The communications manager 1015 and/or at least some of its various sub-components may be physically located at various positions, including being distributed such that portions of functions are implemented at different physical locations by one or more physical devices. In some examples, communications manager 1015 and/or at least some of its various sub-components may be a separate and distinct component in accordance with various aspects of the present disclosure. In other examples, communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 1015 may identify a transmission mode for the transmission of an input signal, the transmission mode having at least three non-contiguous RF spectrum bands. Communications manager 1015 may modulate the input signal to generate a modulated signal according to the identified transmission mode, and transmit the modulated signal at a power level to produce a transmitted signal having a spectral envelope. Communications manager 1015 may control the modulation of the input signal to be transmitted to maintain the spectral envelope to be within a spectral mask that is defined for the transmission mode having at least three non-contiguous RF spectrum bands.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
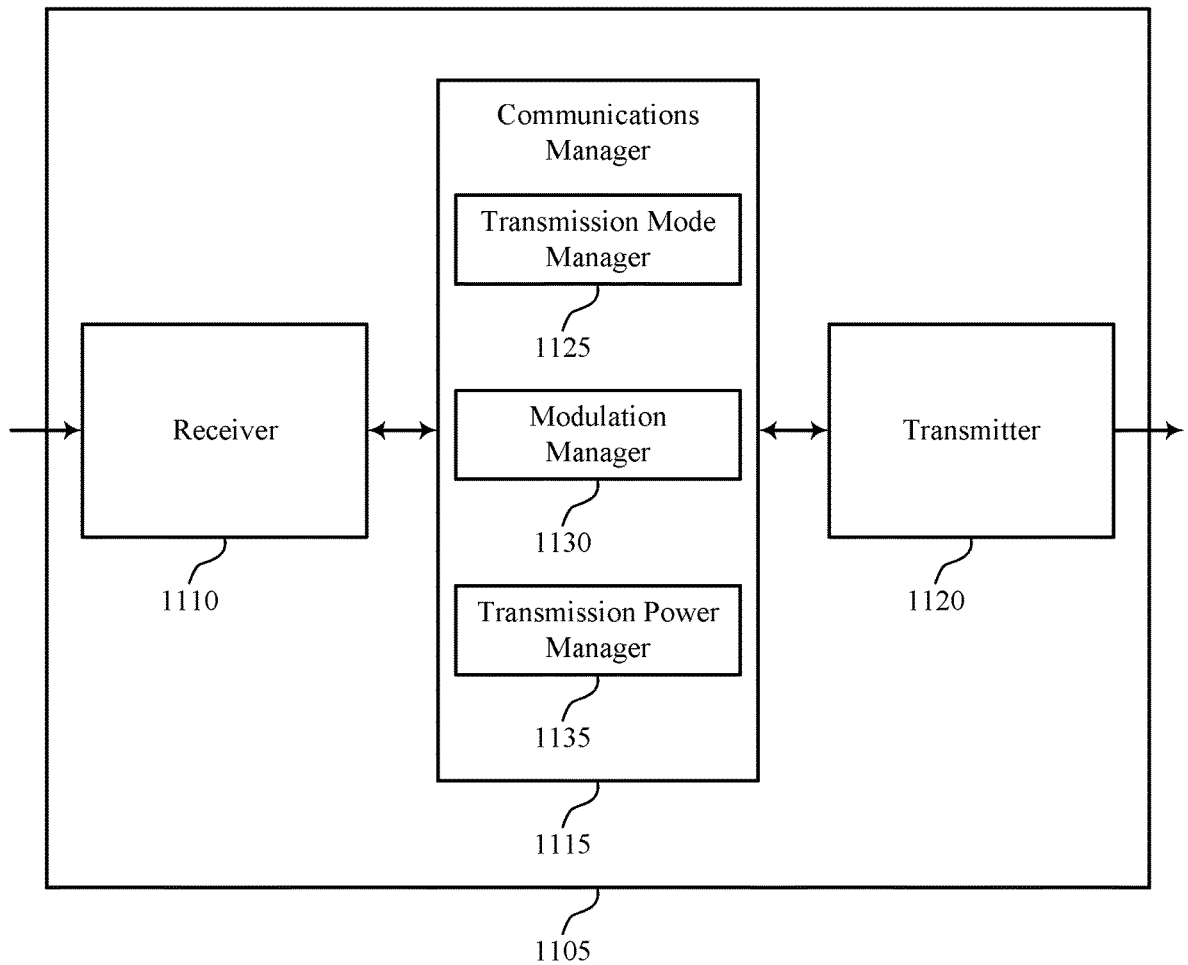

FIG. 11 shows a block diagram 1100 of a wireless device 1105 that supports spectral mask and flatness for WLAN in accordance with aspects of the present disclosure. Wireless device 1105 may be an example of aspects of a wireless device 1005 or a STA 115 and/or AP 105 as described with reference to FIG. 10. Wireless device 1105 may include receiver 1110, communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to spectral mask and flatness for WLAN, etc.). Information may be passed on to other components of the device. The receiver 1110 may be an example of aspects of the transceiver 1335 described with reference to FIG. 13. The receiver 1110 may utilize a single antenna or a set of antennas.

Communications manager 1115 may be an example of aspects of the communications manager 1315 described with reference to FIG. 13. Communications manager 1115 may also include transmission mode manager 1125, modulation manager 1130, and transmission power manager 1135.

Transmission mode manager 1125 may identify a transmission mode for the transmission of an input signal, the transmission mode having at least three non-contiguous RF spectrum bands. In some cases, at least three non-contiguous RF spectrum bands may include a first RF spectrum band of 80 MHz, a second RF spectrum band of 80 MHz, a third RF spectrum band of 80 MHz, and a fourth RF spectrum band of 80 MHz. In other cases, the at least three non-contiguous RF spectrum bands include a first RF spectrum band of 160 MHz, a second RF spectrum band of 80 MHz, and a third RF spectrum band of 80 MHz. In other cases, the at least three non-contiguous RF spectrum bands include the first RF spectrum band of 80 MHz, the second RF spectrum band of 80 MHz, and the third RF spectrum band of 80 MHz In some cases, a total bandwidth of the at least three non-contiguous RF spectrum bands for the transmission mode is greater than 160 MHz. In some cases where the total bandwidth of the at least three non-contiguous RF spectrum bands for the transmission mode is greater than 160 MH, the total bandwidth of the at least three non-contiguous RF spectrum bands for the transmission mode is greater than or equal to 240 MHz. In some cases, the total bandwidth of the at least three non-contiguous RF spectrum bands for the transmission mode is greater than or equal to 320 MHz. In some cases, each of the at least three non-contiguous RF spectrum bands include an RF spectrum band greater than 40 MHz. In some cases, the transmission mode uses a tone spacing of 78.125 kHz, or 156.25 kHz, or 312.5 kHz, or a combination thereof.

Modulation manager 1130 may modulate the input signal to generate a modulated signal according to the identified transmission mode. Modulation manager 1130 may further control the modulation of the input signal to be transmitted to maintain the spectral envelope to be within a spectral mask that is defined for the transmission mode having at least three non-contiguous RF spectrum bands. Modulation manager 1130 may control the modulation of the input signal to be transmitted to maintain the spectral envelope for a set of subcarriers of the at least three non-contiguous RF spectrum bands to be within a spectral flatness deviation range. In some cases, the spectral flatness deviation range is +4 dB/−4 dB for five or more sets of adjacent subcarriers of the set of subcarriers and +4 dB/−6 dB for five or more other sets of adjacent subcarriers of the set of subcarriers. In some cases, the spectral mask includes a first 0 dBr bandwidth corresponding to a first of the at least three non-contiguous RF spectrum bands. In some cases, the spectral mask includes a second 0 dBr bandwidth corresponding to a second of the at least three non-contiguous RF spectrum bands, the second 0 dBr bandwidth non-contiguous with the first 0 dBr bandwidth. In some cases, the spectral mask includes a first unused subband region between the first 0 dBr bandwidth and the second 0 dBr bandwidth, at least a portion of the first unused subband region representing a linear sum of a first interim spectral mask for the first of the at least three non-contiguous RF spectrum bands and a second interim spectral mask for the second of the at least three non-contiguous RF spectrum bands. In some cases, the first unused subband region includes a frequency range where both the first interim spectral mask and the second interim spectral mask each have values for the frequency range greater than −40 dBr and less than −20 dBr. In some cases, the spectral mask includes a first 0 dBr bandwidth corresponding to a first of the at least three non-contiguous RF spectrum bands. In some cases, the spectral mask includes a first transition bandwidth between the first 0 dBr bandwidth and −20 dBr, the first transition bandwidth less than or equal to 2 MHz. In some cases, a first β is associated with one of the at least three non-contiguous RF spectrum bands, where the first 0 dBr bandwidth is β−1 MHz or β−2 MHz. In some cases, a first end of the first transition bandwidth is offset from a center frequency of the at least three non-contiguous RF spectrum bands by β/2+0.5 MHz or β/2+1 MHz. In some cases, a second end of the first transition bandwidth is offset from the center frequency of the at least three non-contiguous RF spectrum bands by β/2−0.5 MHz or β/2−1 MHz. In some cases, the spectral mask further includes a second transition bandwidth between −20 dBr and −28 dBr, where a first end of the second transition bandwidth is the first end of the first transition bandwidth, and a second end of the second transition bandwidth is offset from the center frequency of the at least three non-contiguous RF spectrum bands by β. In some cases, the spectral mask includes a third transition bandwidth between −28 dBr and −40 dBr, where a first end of the third transition bandwidth is the second end of the second transition bandwidth, and a second end of the third transition bandwidth is offset from the center frequency of the at least three non-contiguous RF spectrum bands by 3β/2. In some cases, the spectral flatness deviation range is +4 dB/−4 dB, or +4 dB/−6 dB, or a combination thereof, for the set of subcarriers. In some cases, the first transition bandwidth is 1 MHz or 2 MHz.

Transmission power manager 1135 may transmit the modulated signal at a power level to produce a transmitted signal having a spectral envelope.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
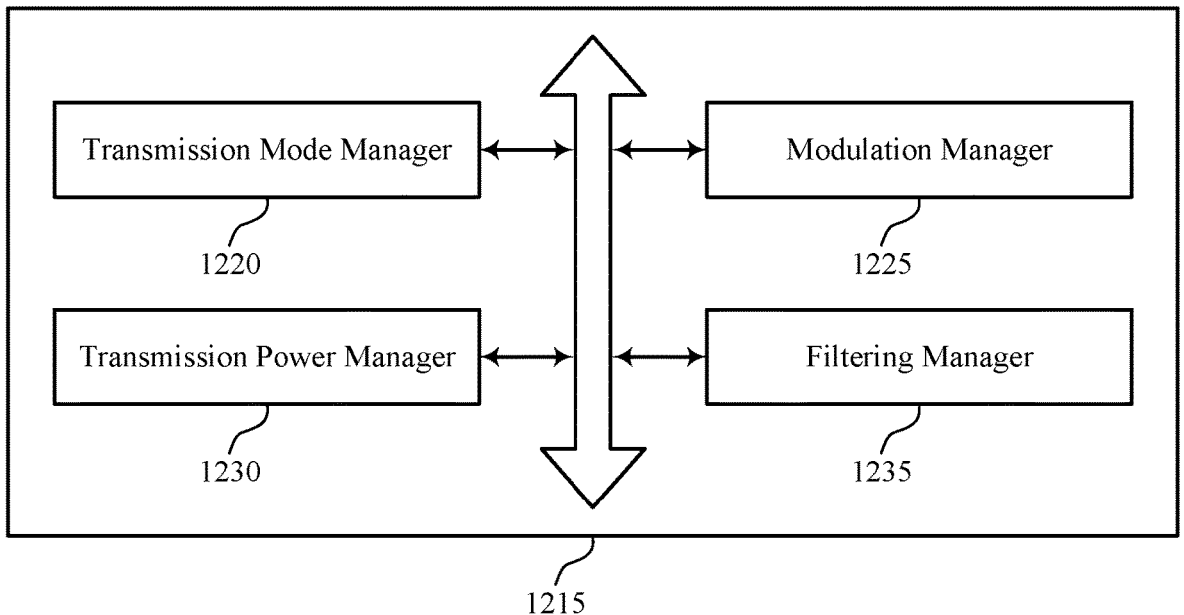

FIG. 12 shows a block diagram 1200 of a communications manager 1215 that supports spectral mask and flatness for WLAN in accordance with aspects of the present disclosure. The communications manager 1215 may be an example of aspects of a communications manager 1015, a communications manager 1115, or a communications manager 1315 described with reference to FIGS. 10, 11, and 13. The communications manager 1215 may include transmission mode manager 1220, modulation manager 1225, transmission power manager 1230, and filtering manager 1235. Each of these modules may communicate, directly or indirectly, with one another (e.g., via one or more buses).

Transmission mode manager 1220 may identify a transmission mode for the transmission of an input signal, the transmission mode having at least three non-contiguous RF spectrum bands. The at least three non-contiguous RF spectrum bands may include a first RF spectrum band of 80 MHz, a second RF spectrum band of 80 MHz, a third RF spectrum band of 80 MHz, and a fourth RF spectrum band of 80 MHz. In some cases, the at least three non-contiguous RF spectrum bands include a first RF spectrum band of 160 MHz, a second RF spectrum band of 80 MHz, and a third RF spectrum band of 80 MHz. In some cases, the at least three non-contiguous RF spectrum bands include the first RF spectrum band of 80 MHz, the second RF spectrum band of 80 MHz, and the third RF spectrum band of 80 MHz. In some cases, a total bandwidth of the at least three non-contiguous RF spectrum bands for the transmission mode is greater than 160 MHz. In some cases, the total bandwidth of the at least three non-contiguous RF spectrum bands for the transmission mode is greater than or equal to 240 MHz. In some cases, the total bandwidth of the at least three non-contiguous RF spectrum bands for the transmission mode is greater than or equal to 320 MHz. In some cases, each of the at least three non-contiguous RF spectrum bands include an RF spectrum band greater than 40 MHz. In some cases, the transmission mode uses a tone spacing of 78.125 kHz, or 156.25 kHz, or 312.5 kHz, or a combination thereof.

Modulation manager 1225 may modulate the input signal to generate a modulated signal according to the identified transmission mode and control the modulation of the input signal to be transmitted to maintain the spectral envelope to be within a spectral mask that is defined for the transmission mode having at least three non-contiguous RF spectrum bands. Modulation manager 1225 may control the modulation of the input signal to be transmitted to maintain the spectral envelope for a set of subcarriers of the at least three non-contiguous RF spectrum bands to be within a spectral flatness deviation range. In some cases, the spectral flatness deviation range is +4 dB/−4 dB for five or more sets of adjacent subcarriers of the set of subcarriers and +4 dB/−6 dB for five or more other sets of adjacent subcarriers of the set of subcarriers. In some cases, the spectral mask includes a first 0 dBr bandwidth corresponding to a first of the at least three non-contiguous RF spectrum bands. In some cases, the spectral mask includes a second 0 dBr bandwidth corresponding to a second of the at least three non-contiguous RF spectrum bands, the second 0 dBr bandwidth non-contiguous with the first 0 dBr bandwidth. In some cases, the spectral mask includes a first unused subband region between the first 0 dBr bandwidth and the second 0 dBr bandwidth, at least a portion of the first unused subband region representing a linear sum of a first interim spectral mask for the first of the at least three non-contiguous RF spectrum bands and a second interim spectral mask for the second of the at least three non-contiguous RF spectrum bands. In some cases, the first unused subband region includes a frequency range where both the first interim spectral mask and the second interim spectral mask each have values for the frequency range greater than −40 dBr and less than −20 dBr. In some cases, the spectral mask includes a first 0 dBr bandwidth corresponding to a first of the at least three non-contiguous RF spectrum bands. In some cases, the spectral mask includes a first transition bandwidth between the first 0 dBr bandwidth and −20 dBr, the first transition bandwidth less than or equal to 2 MHz. In some cases, a first $\beta$ is associated with one of the at least three non-contiguous RF spectrum bands, where the first 0 dBr bandwidth is $\beta$−1 MHz or $\beta$−2 MHz. In some cases, a first end of the first transition bandwidth is offset from a center frequency of the at least three non-contiguous RF spectrum bands by $\beta/2+0.5$ MHz or $\beta/2+1$ MHz. In some cases, a second end of the first transition bandwidth is offset from the center frequency of the at least three non-contiguous RF spectrum bands by $\beta/2−0.5$ MHz or $\beta/2−1$ MHz. In some cases, the spectral mask further includes a second transition bandwidth between −20 dBr and −28 dBr, where a first end of the second transition bandwidth is the first end of the first transition bandwidth, and a second end of the second transition bandwidth is offset from the center frequency of the at least three non-contiguous RF spectrum bands by $\beta$. In some cases, the spectral mask includes a third transition bandwidth between −28 dBr and −40 dBr, where a first end of the third transition bandwidth is the second end of the second transition bandwidth, and a second end of the third transition bandwidth is offset from the center frequency of the at least three non-contiguous RF spectrum bands by $3\beta/2$. In some cases, the spectral flatness deviation range is +4 dB/−4 dB, or +4 dB/−6 dB, or a combination thereof, for the set of subcarriers. In some cases, the first transition bandwidth is 1 MHz or 2 MHz.

Transmission power manager 1230 may transmit the modulated signal at a power level to produce a transmitted signal having a spectral envelope.

Filtering manager 1235 may filter the input signal using a filter to generate a filtered input signal. Modulation manager 1225 may then modulate the filtered input signal to generate the modulated signal. In some cases, filtering manager 1235 may control the filter to maintain the spectral envelope to be within the spectral mask that is defined for the transmission mode.

Figure 13:
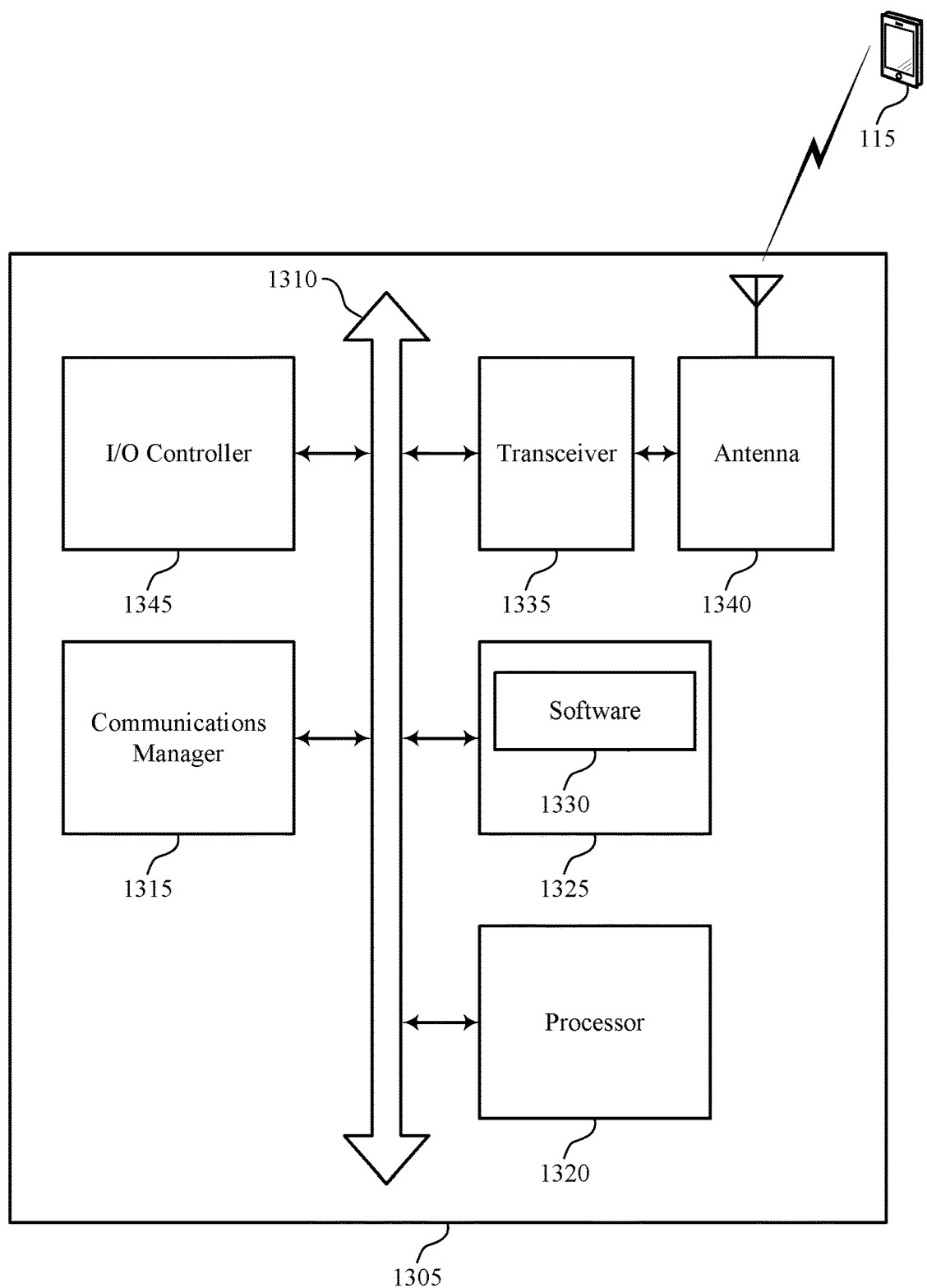
FIG. 13 illustrates a block diagram of a system including a wireless device that supports spectral mask and flatness for WLAN in accordance with aspects of the present disclosure.

FIG. 13 shows a diagram of a system 1300 including a device 1305 that supports spectral mask and flatness for WLAN in accordance with aspects of the present disclosure. Device 1305 may be an example of or include the components of wireless device 1005, wireless device 1105, or a STA 115 and/or AP 105 as described above, e.g., with reference to FIGS. 10 and 11. Device 1305 may include components for bi-directional voice and data communications including components for transmitting and receiving communications, including communications manager 1315, processor 1320, memory 1325, software 1330, transceiver 1335, antenna 1340, and I/O controller 1345. These components may be in electronic communication via one or more buses (e.g., bus 1310).

Processor 1320 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting spectral mask and flatness for WLAN).

Memory 1325 may include random access memory (RAM) and read only memory (ROM). The memory 1325 may store computer-readable, computer-executable software 1330 including instructions that, when executed, cause the processor to perform various functions described herein. In some cases, the memory 1325 may contain, among other things, a basic input/output system (BIOS) which may control basic hardware or software operation such as the interaction with peripheral components or devices.

Software 1330 may include code to implement aspects of the present disclosure, including code to support spectral mask and flatness for WLAN. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system. In other cases, I/O controller 1345 may represent or interact with a modem, a keyboard, a mouse, a touchscreen, or a similar device. In some cases, I/O controller 1345 may be implemented as part of a processor. In some cases, a user may interact with device 1305 via I/O controller 1345 or via hardware components controlled by I/O controller 1345.

Figure 14:
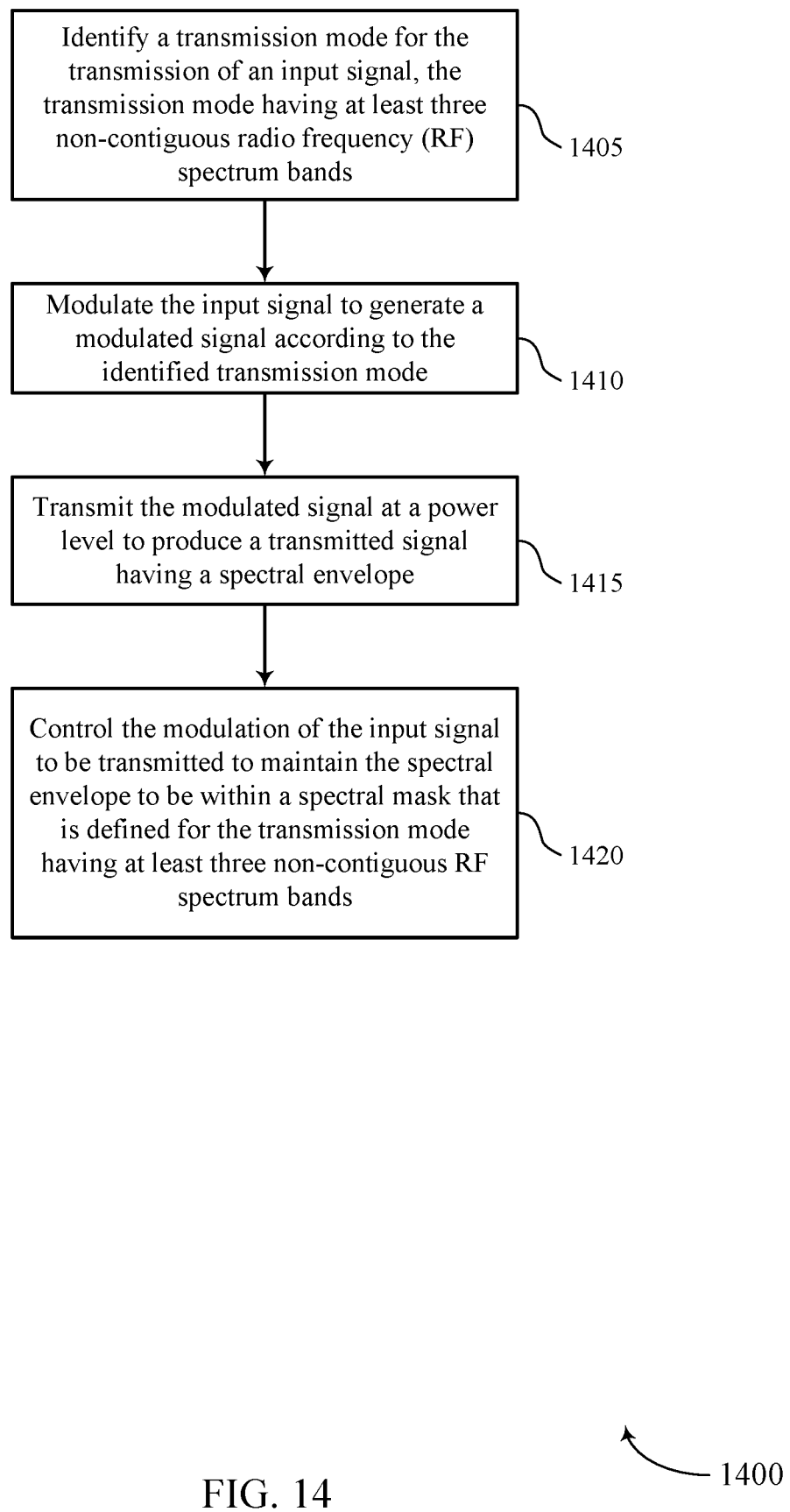
FIGS. 14 through 16 illustrate methods for spectral mask and flatness for WLAN in accordance with aspects of the present disclosure.

FIG. 14 shows a flowchart illustrating a method 1400 for spectral mask and flatness for WLAN in accordance with aspects of the present disclosure. The operations of method 1400 may be implemented by an AP 105, a STA 115, and/or any of their components as described herein. For example, the operations of method 1400 may be performed by a communications manager as described with reference to FIGS. 10 through 13. In some examples, a STA 115 and/or AP 105 may execute a set of codes to control the functional elements of the device to perform the functions described below. Additionally or alternatively, the STA 115 and/or AP 105 may perform aspects of the functions described below using special-purpose hardware.

At 1405 the STA 115 and/or AP 105 may identify a transmission mode for the transmission of an input signal, the transmission mode having at least three non-contiguous RF spectrum bands. The operations of 1405 may be performed according to the methods described herein. In certain examples, aspects of the operations of 1405 may be performed by a transmission mode manager as described with reference to FIGS. 10 through 13.

At 1410 the STA 115 and/or AP 105 may modulate the input signal to generate a modulated signal according to the identified transmission mode. The operations of 1410 may be performed according to the methods described herein. In certain examples, aspects of the operations of 1410 may be performed by a modulation manager as described with reference to FIGS. 10 through 13.

At 1415 the STA 115 and/or AP 105 may transmit the modulated signal at a power level to produce a transmitted signal having a spectral envelope. The operations of 1415 may be performed according to the methods described herein. In certain examples, aspects of the operations of 1415 may be performed by a transmission power manager as described with reference to FIGS. 10 through 13.

At 1420 the STA 115 and/or AP 105 may control the modulation of the input signal to be transmitted to maintain the spectral envelope to be within a spectral mask that is defined for the transmission mode having at least three non-contiguous RF spectrum bands. The operations of 1420 may be performed according to the methods described herein. In certain examples, aspects of the operations of 1420 may be performed by a modulation manager as described with reference to FIGS. 10 through 13.

Figure 15:
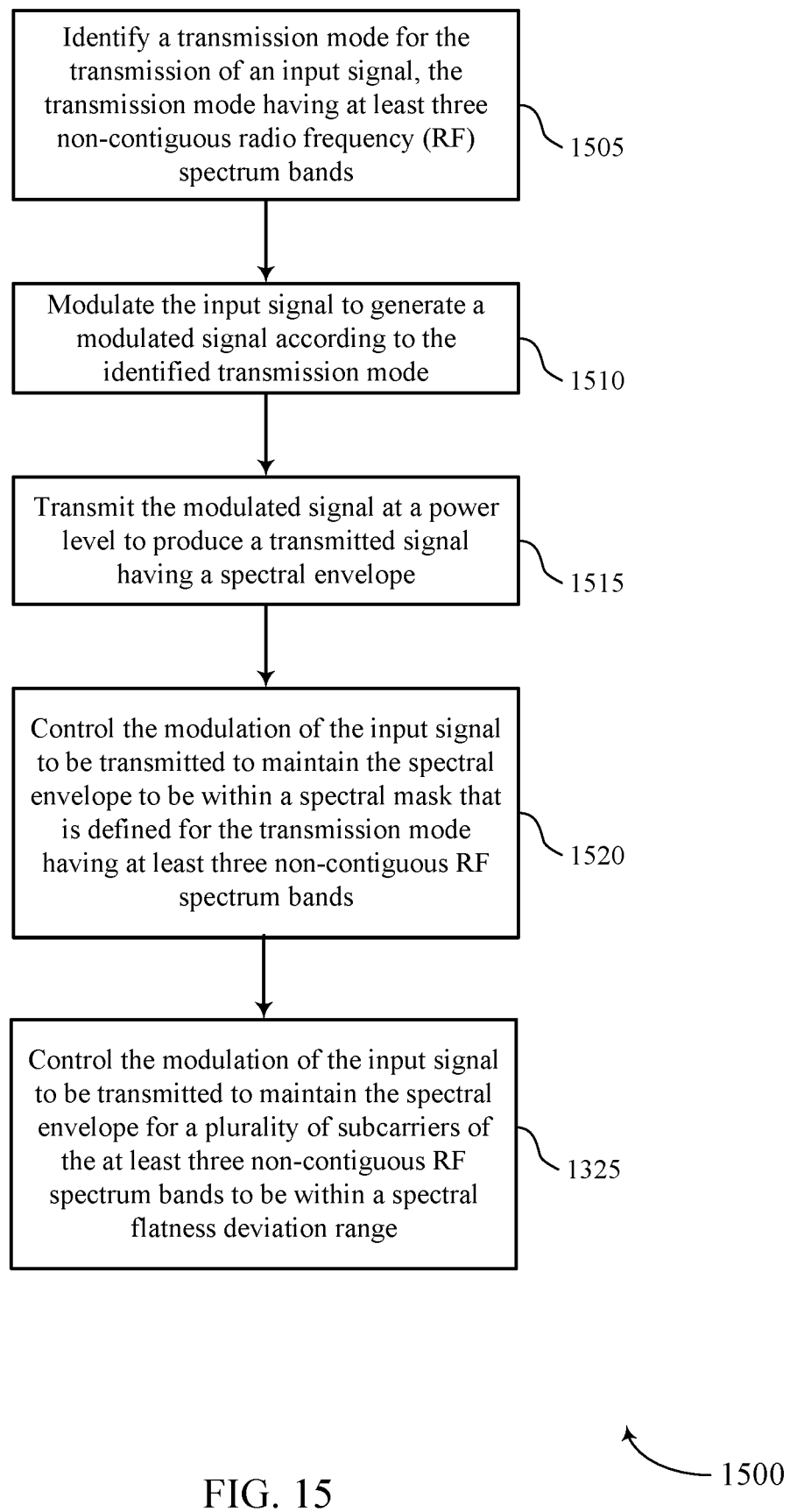

FIG. 15 shows a flowchart illustrating a method 1500 for spectral mask and flatness for WLAN in accordance with aspects of the present disclosure. The operations of method 1500 may be implemented by an AP 105, a STA 115, and/or any of their components as described herein. For example, the operations of method 1500 may be performed by a communications manager as described with reference to FIGS. 10 through 13. In some examples, a STA 115 and/or AP 105 may execute a set of codes to control the functional elements of the device to perform the functions described below. Additionally or alternatively, the STA 115 and/or AP 105 may perform aspects of the functions described below using special-purpose hardware.

At 1505 the STA 115 and/or AP 105 may identify a transmission mode for the transmission of an input signal, the transmission mode having at least three non-contiguous RF spectrum bands. The operations of 1505 may be performed according to the methods described herein. In certain examples, aspects of the operations of 1505 may be performed by a transmission mode manager as described with reference to FIGS. 10 through 13.

At 1510 the STA 115 and/or AP 105 may modulate the input signal to generate a modulated signal according to the identified transmission mode. The operations of 1510 may be performed according to the methods described herein. In certain examples, aspects of the operations of 1510 may be performed by a modulation manager as described with reference to FIGS. 10 through 13.

At 1515 the STA 115 and/or AP 105 may transmit the modulated signal at a power level to produce a transmitted signal having a spectral envelope. The operations of 1515 may be performed according to the methods described herein. In certain examples, aspects of the operations of 1515 may be performed by a transmission power manager as described with reference to FIGS. 10 through 13.

At 1520 the STA 115 and/or AP 105 may control the modulation of the input signal to be transmitted to maintain the spectral envelope to be within a spectral mask that is defined for the transmission mode having at least three non-contiguous RF spectrum bands. The operations of 1520 may be performed according to the methods described herein. In certain examples, aspects of the operations of 1520 may be performed by a modulation manager as described with reference to FIGS. 10 through 13.

At 1525 the STA 115 and/or AP 105 may control the modulation of the input signal to be transmitted to maintain the spectral envelope for a plurality of subcarriers of the at least three non-contiguous RF spectrum bands to be within a spectral flatness deviation range. The operations of 1525 may be performed according to the methods described herein. In certain examples, aspects of the operations of 1525 may be performed by a modulation manager as described with reference to FIGS. 10 through 13.

Figure 16:
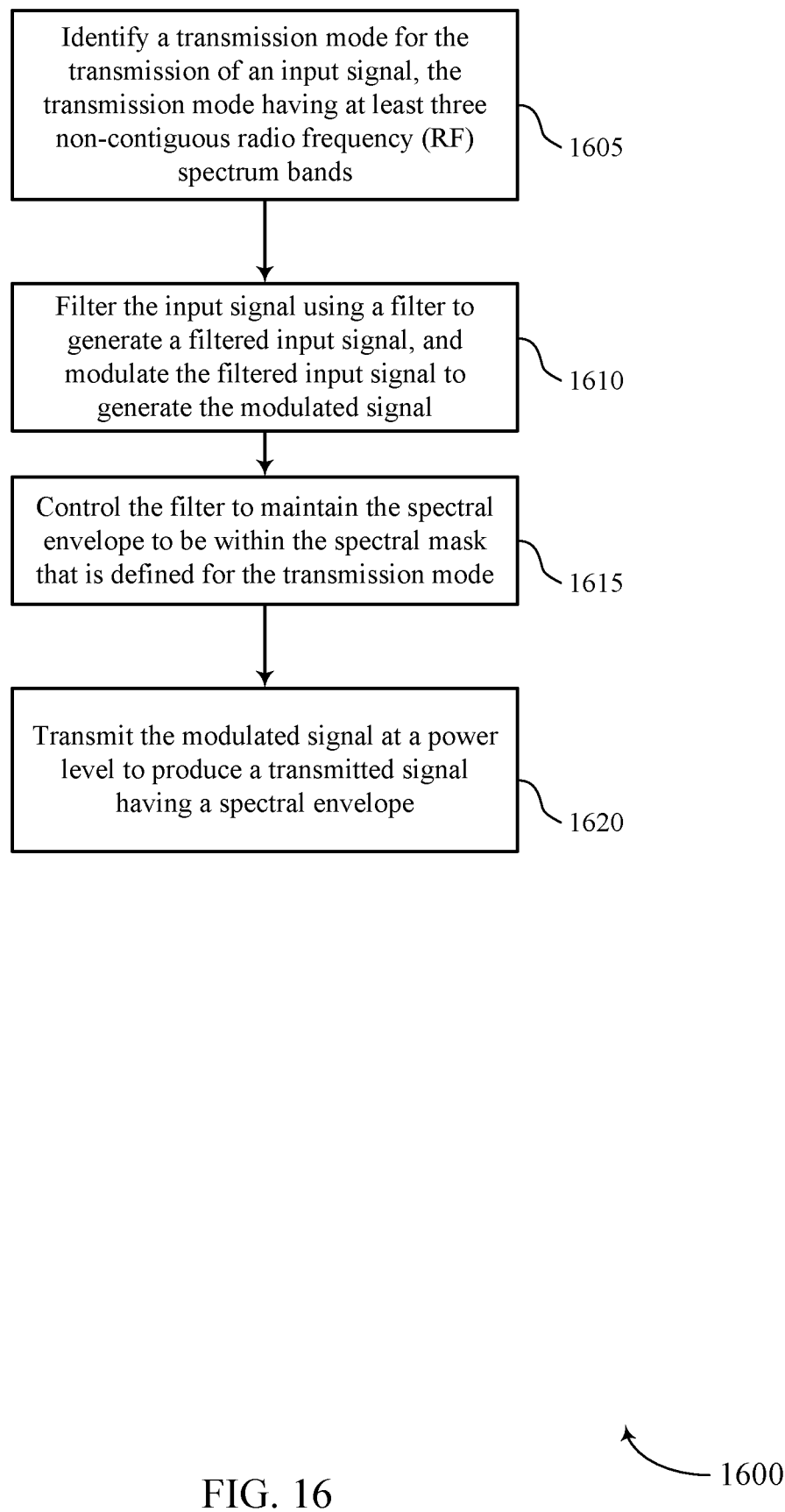

FIG. 16 shows a flowchart illustrating a method 1600 for spectral mask and flatness for WLAN in accordance with aspects of the present disclosure. The operations of method 1600 may be implemented by an AP 105, a STA 115, and/or any of their components as described herein. For example, the operations of method 1600 may be performed by a communications manager as described with reference to FIGS. 10 through 13. In some examples, a STA 115 and/or AP 105 may execute a set of codes to control the functional elements of the device to perform the functions described below. Additionally or alternatively, the STA 115 and/or AP 105 may perform aspects of the functions described below using special-purpose hardware.

At 1605 the STA 115 and/or AP 105 may identify a transmission mode for the transmission of an input signal, the transmission mode having at least three non-contiguous RF spectrum bands. The operations of 1605 may be performed according to the methods described herein. In certain examples, aspects of the operations of 1605 may be performed by a transmission mode manager as described with reference to FIGS. 10 through 13.

At 1610 the STA 115 and/or AP 105 may filter the input signal using a filter to generate a filtered input signal, and modulate the filtered input signal to generate the modulated signal. The operations of 1610 may be performed according to the methods described herein. In certain examples, aspects of the operations of 1610 may be performed by a filtering manager as described with reference to FIGS. 10 through 13.

At 1615 the STA 115 and/or AP 105 may control the filter to maintain the spectral envelope to be within the spectral mask that is defined for the transmission mode. The operations of 1615 may be performed according to the methods described herein. In certain examples, aspects of the operations of 1615 may be performed by a filtering manager as described with reference to FIGS. 10 through 13.

At 1620 the STA 115 and/or AP 105 may transmit the modulated signal at a power level to produce a transmitted signal having a spectral envelope. The operations of 1620 may be performed according to the methods described herein. In certain examples, aspects of the operations of 1620 may be performed by a transmission power manager as described with reference to FIGS. 10 through 13.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, WLAN 100 and WLAN 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a transmission mode for the transmission of an input signal, the transmission mode having at least three non-contiguous radio frequency (RF) spectrum bands;
   modulating the input signal to generate a modulated signal according to the identified transmission mode;
   transmitting the modulated signal at a power level to produce a transmitted signal having a spectral envelope; and
   controlling the modulation of the input signal to be transmitted to maintain the spectral envelope to be within a spectral mask that is defined for the transmission mode having at least three non-contiguous RF spectrum bands.

2. The method of claim 1, wherein the at least three non-contiguous RF spectrum bands comprise:
   a first RF spectrum band of 160 MHz, a second RF spectrum band of 80 MHz, and a third RF spectrum band of 80 MHz; or
   the first RF spectrum band of 80 MHz, the second RF spectrum band of 80 MHz, and the third RF spectrum band of 80 MHz; or
   the first RF spectrum band of 80 MHz, the second RF spectrum band of 80 MHz, the third RF spectrum band of 80 MHz, and a fourth RF spectrum band of 80 MHz.

3. The method of claim 1, wherein a total bandwidth of the at least three non-contiguous RF spectrum bands for the transmission mode is greater than 160 MHz.

4. The method of claim 3, wherein the total bandwidth of the at least three non-contiguous RF spectrum bands for the transmission mode is greater than or equal to 240 MHz.

5. The method of claim 4, wherein the total bandwidth of the at least three non-contiguous RF spectrum bands for the transmission mode is greater than or equal to 320 MHz.

6. The method of claim 1, wherein the spectral mask comprises:
   a first 0 dBr bandwidth corresponding to a first of the at least three non-contiguous RF spectrum bands;
   a second 0 dBr bandwidth corresponding to a second of the at least three non-contiguous RF spectrum bands, the second 0 dBr bandwidth non-contiguous with the first 0 dBr bandwidth; and
   a first unused subband region between the first 0 dBr bandwidth and the second 0 dBr bandwidth, at least a portion of the first unused subband region representing a linear sum of a first interim spectral mask for the first of the at least three non-contiguous RF spectrum bands and a second interim spectral mask for the second of the at least three non-contiguous RF spectrum bands.

7. The method of claim 6, wherein the first unused subband region comprises a frequency range wherein both the first interim spectral mask and the second interim spectral mask each have values for the frequency range greater than −40 dBr and less than −20 dBr.

8. The method of claim 1, wherein the spectral mask comprises:
a first 0 dBr bandwidth corresponding to a first of the at least three non-contiguous RF spectrum bands; and
a first transition bandwidth between the first 0 dBr bandwidth and −20 dBr, the first transition bandwidth less than or equal to 2 MHz.

9. The method of claim 8, wherein the first transition bandwidth is 1 MHz or 2 MHz.

10. The method of claim 8, wherein:
a first bandwidth ($\beta$) is associated with one of the at least three non-contiguous RF spectrum bands, wherein the first 0 dBr bandwidth is $\beta-1$ MHz or $\beta-2$ MHz;
a first end of the first transition bandwidth is offset from a center frequency of the at least three non-contiguous RF spectrum bands by $\beta/2+0.5$ MHz or $\beta/2+1$ MHz; and
a second end of the first transition bandwidth is offset from the center frequency of the at least three non-contiguous RF spectrum bands by $\beta/2-0.5$ MHz or $\beta/2-1$ MHz.

11. The method of claim 10, wherein the spectral mask further comprises:
a second transition bandwidth between −20 dBr and −28 dBr, wherein a first end of the second transition bandwidth is the first end of the first transition bandwidth, and a second end of the second transition bandwidth is offset from the center frequency of the at least three non-contiguous RF spectrum bands by $\beta$; and
a third transition bandwidth between −28 dBr and −40 dBr, wherein a first end of the third transition bandwidth is the second end of the second transition bandwidth, and a second end of the third transition bandwidth is offset from the center frequency of the at least three non-contiguous RF spectrum bands by $3\beta/2$.

12. The method of claim 1, further comprising:
controlling the modulation of the input signal to be transmitted to maintain the spectral envelope for a plurality of subcarriers of the at least three non-contiguous RF spectrum bands to be within a spectral flatness deviation range.

13. The method of claim 12, wherein the spectral flatness deviation range is +4 dB/−4 dB, or +4 dB/−6 dB, or a combination thereof, for the plurality of subcarriers.

14. The method of claim 12, wherein the spectral flatness deviation range is +4 dB/−4 dB for five or more sets of adjacent subcarriers of the plurality of subcarriers and +4 dB/−6 dB for five or more other sets of adjacent subcarriers of the plurality of subcarriers.

15. The method of claim 1, wherein each of the at least three non-contiguous RF spectrum bands comprise an RF spectrum band greater than 40 MHz.

16. The method of claim 1, wherein the transmission mode uses a tone spacing of 78.125 kHz, or 156.25 kHz, or 312.5 kHz, or a combination thereof.

17. The method of claim 1, wherein modulating the input signal comprises:
filtering the input signal using a filter to generate a filtered input signal, and modulating the filtered input signal to generate the modulated signal; and
controlling the filter to maintain the spectral envelope to be within the spectral mask that is defined for the transmission mode.

18. An apparatus for wireless communication, comprising:
means for identifying a transmission mode for the transmission of an input signal, the transmission mode having at least three non-contiguous radio frequency (RF) spectrum bands;
means for modulating the input signal to generate a modulated signal according to the identified transmission mode;
means for transmitting the modulated signal at a power level to produce a transmitted signal having a spectral envelope; and
means for controlling the modulation of the input signal to be transmitted to maintain the spectral envelope to be within a spectral mask that is defined for the transmission mode having at least three non-contiguous RF spectrum bands.

19. An apparatus for wireless communication, comprising:
a processor;
memory in electronic communication with the processor; and
instructions stored in the memory and executable by the processor to cause the apparatus to:
identify a transmission mode for the transmission of an input signal, the transmission mode having at least three non-contiguous radio frequency (RF) spectrum bands;
modulate the input signal to generate a modulated signal according to the identified transmission mode;
transmit the modulated signal at a power level to produce a transmitted signal having a spectral envelope; and
control the modulation of the input signal to be transmitted to maintain the spectral envelope to be within a spectral mask that is defined for the transmission mode having at least three non-contiguous RF spectrum bands.

20. The apparatus of claim 19, wherein the at least three non-contiguous RF spectrum bands comprise:
a first RF spectrum band of 160 MHz, a second RF spectrum band of 80 MHz, and a third RF spectrum band of 80 MHz; or
the first RF spectrum band of 80 MHz, the second RF spectrum band of 80 MHz, and the third RF spectrum band of 80 MHz; or
the first RF spectrum band of 80 MHz, the second RF spectrum band of 80 MHz, the third RF spectrum band of 80 MHz, and a fourth RF spectrum band of 80 MHz.

21. The apparatus of claim 19, wherein a total bandwidth of the at least three non-contiguous RF spectrum bands for the transmission mode is greater than 160 MHz.

22. The apparatus of claim 21, wherein the total bandwidth of the at least three non-contiguous RF spectrum bands for the transmission mode is greater than or equal to 240 MHz.

23. The apparatus of claim 21, wherein the total bandwidth of the at least three non-contiguous RF spectrum bands for the transmission mode is greater than or equal to 320 MHz.

24. The apparatus of claim 19, wherein the instructions to the spectral mask are executable by the processor to cause the apparatus to:
- a first 0 dBr bandwidth corresponding to a first of the at least three non-contiguous RF spectrum bands;
- a second 0 dBr bandwidth corresponding to a second of the at least three non-contiguous RF spectrum bands, the second 0 dBr bandwidth non-contiguous with the first 0 dBr bandwidth; and
- a first unused subband region between the first 0 dBr bandwidth and the second 0 dBr bandwidth, at least a portion of the first unused subband region representing a linear sum of a first interim spectral mask for the first of the at least three non-contiguous RF spectrum bands and a second interim spectral mask for the second of the at least three non-contiguous RF spectrum bands.

25. The apparatus of claim 24, wherein the first unused subband region comprises a frequency range wherein both the first interim spectral mask and the second interim spectral mask each have values for the frequency range greater than −40 dBr and less than −20 dBr.

26. The apparatus of claim 19, wherein the instructions to the spectral mask are executable by the processor to cause the apparatus to:
- a first 0 dBr bandwidth corresponding to a first of the at least three non-contiguous RF spectrum bands; and
- a first transition bandwidth between the first 0 dBr bandwidth and −20 dBr, the first transition bandwidth less than or equal to 2 MHz.

27. The apparatus of claim 26, wherein the first transition bandwidth is 1 MHz or 2 MHz.

28. The apparatus of claim 26, wherein:
- a first bandwidth ($\beta$) is associated with one of the at least three non-contiguous RF spectrum bands, wherein the first 0 dBr bandwidth is $\beta-1$ MHz or $\beta-2$ MHz;
- a first end of the first transition bandwidth is offset from a center frequency of the at least three non-contiguous RF spectrum bands by $\beta/2+0.5$ MHz or $\beta/2+1$ MHz; and
- a second end of the first transition bandwidth is offset from the center frequency of the at least three non-contiguous RF spectrum bands by $\beta/2-0.5$ MHz or $\beta/2-1$ MHz.

29. The apparatus of claim 28, wherein the instructions to the spectral mask further are executable by the processor to cause the apparatus to:
- a second transition bandwidth between −20 dBr and −28 dBr, wherein a first end of the second transition bandwidth is the first end of the first transition bandwidth, and a second end of the second transition bandwidth is offset from the center frequency of the at least three non-contiguous RF spectrum bands by $\beta$; and
- a third transition bandwidth between −28 dBr and −40 dBr, wherein a first end of the third transition bandwidth is the second end of the second transition bandwidth, and a second end of the third transition bandwidth is offset from the center frequency of the at least three non-contiguous RF spectrum bands by $3\beta/2$.

30. A non-transitory computer-readable medium storing code for wireless communication, the code comprising instructions executable by a processor to:
- identify a transmission mode for the transmission of an input signal, the transmission mode having at least three non-contiguous radio frequency (RF) spectrum bands;
- modulate the input signal to generate a modulated signal according to the identified transmission mode;
- transmit the modulated signal at a power level to produce a transmitted signal having a spectral envelope; and
- control the modulation of the input signal to be transmitted to maintain the spectral envelope to be within a spectral mask that is defined for the transmission mode having at least three non-contiguous RF spectrum bands.

\* \* \* \* \*